(12) United States Patent
Liu

(10) Patent No.: US 12,745,223 B2
(45) Date of Patent: Sep. 22, 2026

(54) METHOD AND DEVICE FOR FLEXIBLE TRANSMISSION DIRECTION CONFIGURATIONS IN WIRELESS COMMUNICATIONS

(71) Applicant: SHANGHAI CODUS TECHNOLOGY COMPANY LIMITED, Shanghai (CN)

(72) Inventor: Zheng Liu, Shanghai (CN)

(73) Assignee: SHANGHAI CODUS TECHNOLOGY COMPANY LIMITED, Shanghai (CN)

( * ) Notice: Subject to any disclaimer, the term of this patent is extended or adjusted under 35 U.S.C. 154(b) by 240 days.

(21) Appl. No.: 18/408,573

(22) Filed: Jan. 10, 2024

(65) Prior Publication Data

US 2024/0147436 A1 May 2, 2024

Related U.S. Application Data

(63) Continuation of application No. PCT/CN2022/104043, filed on Jul. 6, 2022.

(30) Foreign Application Priority Data

Jul. 13, 2021 (CN) ......................... 202110787952.2

(51) Int. Cl.

*H04W 72/0446* (2023.01)
*H04W 72/0453* (2023.01)
*H04W 72/0457* (2023.01)

(52) U.S. Cl.

CPC ... *H04W 72/0446* (2013.01); *H04W 72/0453* (2013.01); *H04W 72/0457* (2023.01)

(58) Field of Classification Search

CPC ......... H04W 72/0446; H04W 72/0457; H04W 72/0453; H04W 72/04; H04W 36/06;

(Continued)

(56) References Cited

U.S. PATENT DOCUMENTS

2009/0259624 A1* 10/2009 DeMaris ........... G06F 16/24534
2021/0011864 A1* 1/2021 Guim Bernat ...... G06F 12/0238

(Continued)

FOREIGN PATENT DOCUMENTS

CN 111052661 A 4/2020
CN 111901871 * 11/2020

(Continued)

OTHER PUBLICATIONS

ISR received in application No. PCT/CN2022/104043 dated Oct. 10, 2022.

(Continued)

*Primary Examiner* — Mewale A Ambaye
(74) *Attorney, Agent, or Firm* — Abd Almonem Doolaanea

(57) ABSTRACT

A node receives a first information block and a second information block, the first information block determines X1 time-domain symbols corresponding to a first link direction, and the second information block determines X2 time-domain symbols corresponding to a second link direction; determines a target link direction and operates a target signal in a target time-frequency resource set; the target time-frequency resource set comprises one of the X1 time-domain symbols in time domain, and the target time-frequency resource set comprises one of the X2 time-domain symbols in time domain; the first link direction is uplink or downlink, and the second link direction is one of uplink, downlink, or flexible link; the target time-frequency resource set belongs to a target sub-band in frequency domain, and configuration information of the target sub-band determines the target link direction. The present application improves the resource utilization.

20 Claims, 6 Drawing Sheets

(58) Field of Classification Search
CPC . H04W 72/12; H04L 5/00; H04B 7/26; H04B 7/024
See application file for complete search history.

(56) References Cited

U.S. PATENT DOCUMENTS

| | | | | |
|---|---|---|---|---|
| 2021/0136645 | A1* | 5/2021 | Zhao | H04W 36/30 |
| 2021/0219252 | A1* | 7/2021 | Liu | H04W 72/0446 |

FOREIGN PATENT DOCUMENTS

| | | | | |
|---|---|---|---|---|
| CN | 111901871 | A | | 11/2020 |
| CN | 109644450 | | * | 12/2020 |
| CN | 109644450 | B | | 12/2020 |
| WO | 2014180896 | A1 | | 11/2014 |

OTHER PUBLICATIONS

Moderator (AT&T) “Feature Lead Summary #3 of 8.10.1” 3GPP TSG-RAN WG1 #105-e R1-2106056 May 28, 2021.

* cited by examiner

METHOD AND DEVICE FOR FLEXIBLE TRANSMISSION DIRECTION CONFIGURATIONS IN WIRELESS COMMUNICATIONS

CROSS REFERENCE TO RELATED APPLICATIONS

This application is the continuation of an international patent application No. PCT/CN2022/104043, filed on Jul. 6, 2022, and claims the priority benefit of Chinese Patent Application No. 202110787952.2, filed on Jul. 13, 2021, the full disclosure of which is incorporated herein by reference.

BACKGROUND

Technical Field

The present application relates to transmission methods and devices in wireless communication systems, and in particular to a transmission scheme and device for flexible transmission direction configuration in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at 3GPP RAN #75th plenary to standardize NR. A Study Item (SI) and a Work Item (WI) of NR Rel-17 was decided to start at 3GPP RAN #86th plenary, and it is anticipated that an SI and WI of NR Rel-18 will be approved at 3GPP RAN #94eth plenary.

In NR technology, enhanced Mobile BroadBand (eMBB), Ultra-reliable and Low Latency Communications (URLLC), and massive Machine Type Communications (mMTC) are three main application scenarios.

SUMMARY

In existing NR systems, spectrum resources are statically divided into FDD spectrum and TDD spectrum. For the TDD spectrum, both the base station and User Equipment (UE) operate in half-duplex mode. This half-duplex mode avoids self-interference and can mitigate the impact of Cross Link interference, but also brings about a decrease in resource utilization and an increase in latency. To address these problems, supporting flexible duplex mode on the TDD spectrum or FDD spectrum becomes a possible solution.

The present application discloses a solution to the problem of supporting the configuration of link direction in flexible duplex mode. It should be noted that in the description of the application, flexible duplex mode is only used as a typical application scenario or example; the present application is also applicable to other scenarios confronting similar problems (for example, there are scenarios where the link direction changes, or other scenarios that support multi-level configuration of the transmission direction, or scenarios with more capable base stations or user equipment, such as scenarios that support full-duplex on the same frequency, or scenarios for different applications, such as eMBB and URLLC), where similar technical effects can be achieved. Additionally, the adoption of a unified solution for various scenarios, including but not limited to scenarios of eMBB and URLLC, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first information block and receiving a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction;

determining a target link direction and operating a target signal in a target time-frequency resource set, the target time-frequency resource set comprising at least one time-domain symbol in time domain, a link direction of any time-domain symbol comprised in the target time-frequency resource set in time domain being the target link direction, and the operation being receiving or the operation being transmitting;

herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

In one embodiment, a target link direction is determined based on configuration information of the target sub-band, so as to support flexible duplex mode configured individually per band, which provides frequency-domain coordination capabilities to reduce self-interference and cross-link interference and improves transmission performance and reducing the impact on legacy users.

In one embodiment, allowing a second information block to override uplink and downlink symbols configured by a first information block in a target sub-band provides more flexible link direction configuration while reducing interference, thereby increasing scheduling flexibility and improving resource utilization.

According to one aspect of the present application, the above method is characterized in that the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol (s) belonging to the first time window among the X1 time-domain symbols is equal to the second number of symbol(s); the first number of symbol(s) is a non-negative integer, the second number of symbol(s) is a non-negative integer, and the configuration period length is greater than 0.

According to one aspect of the present application, the above method is characterized in comprising:

receiving a third information block;

herein, the third information block is used to determine configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

In one embodiment, whether a second information block can override a first information block is determined based on a frequency-domain location or a link direction indication of a target sub-band takes into account the self-interference and cross-link interference incurred by neighbor channel leakage brought by flexible duplex as well as the flexibility of the configuration, which balances the interference suppression and scheduling flexibility to optimize the system performance.

According to one aspect of the present application, the above method is characterized in that the target sub-band in frequency domain comprises a subcarrier belonging to a first BWP, an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

In one embodiment, whether the link direction of the legacy configuration can be overridden is determined according to a relation between a frequency band supporting flexible duplex and an initial BWP or a default BWP or a relation between center frequencies of comprised uplink and downlink BWPs, thus avoiding impact on the legacy transmissions and guaranteeing the backward compatibility of the system.

According to one aspect of the present application, the above method is characterized in that one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

In one embodiment, a slot format in which an uplink time-domain symbol is earlier than a downlink time-domain symbol is supported, so that it can more flexibly support the configuration of link direction, maximize the scheduling freedom of flexible duplex, and further improve the resource utilization rate and system performance.

According to one aspect of the present application, the above method is characterized in comprising:

receiving a first signaling;

herein, the first signaling is used to determine the target time-frequency resource set, and a type of the first signaling and the target link direction are used to determine whether the operation is receiving or transmitting.

According to one aspect of the present application, the above method is characterized in that the second information block comprises M2 sub-information blocks, the M2 sub-information blocks are respectively used to determine slot formats respectively corresponding to M2 candidate sub-bands, the target sub-band is one of the M2 candidate sub-bands, M2 being a positive integer greater than 1.

The present application provides a method in a second node for wireless communications, comprising:

transmitting a first information block and transmitting a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction;

determining a target link direction and executing a target signal in a target time-frequency resource set, the target time-frequency resource set comprising at least one time-domain symbol in time domain, a link direction of any time-domain symbol comprised in the target time-frequency resource set in time domain being the target link direction, and the execution being transmitting or the execution being receiving;

herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

According to one aspect of the present application, the above method is characterized in that the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol (s) belonging to the first time window among the X1 time-domain symbols is equal to the second number of symbol(s); the first number of symbol(s) is a non-negative integer, the second number of symbol(s) is a non-negative integer, and the configuration period length is greater than 0.

According to one aspect of the present application, the above method is characterized in comprising:

transmitting a third information block;

herein, the third information block is used to indicate configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

According to one aspect of the present application, the above method is characterized in that the target sub-band in frequency domain comprises a subcarrier belonging to a first BWP, an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

According to one aspect of the present application, the above method is characterized in that one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

According to one aspect of the present application, the above method is characterized in comprising:

transmitting a first signaling;

herein, the first signaling is used to determine the target time-frequency resource set, and a type of the first signaling and the target link direction are used to determine whether the execution is transmitting or receiving.

According to one aspect of the present application, the above method is characterized in that the second information block comprises M2 sub-information blocks, the M2 sub-information blocks are respectively used to determine slot formats respectively corresponding to M2 candidate sub-bands, the target sub-band is one of the M2 candidate sub-bands, M2 being a positive integer greater than 1.

The present application provides a first node for wireless communications, comprising:

a first receiver, receiving a first information block and receiving a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; and a first transceiver, determining a target link direction and operating a target signal in a target time-frequency resource set, the target time-frequency resource set comprising at least one time-domain symbol in time domain, a link direction of any time-domain symbol comprised in the target time-frequency resource set in time domain being the target link direction, and the operation being receiving or the operation being transmitting;

herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

The present application provides a second node for wireless communications, comprising:

a first transmitter, transmitting a first information block and transmitting a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; and a second transceiver, determining a target link direction and executing a target signal in a target time-frequency resource set, the target time-frequency resource set comprising at least one time-domain symbol in time domain, a link direction of any time-domain symbol comprised in the target time-frequency resource set in time domain being the target link direction, and the execution being transmitting or the execution being receiving;

herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

In one embodiment, the method in the present application is advantageous in the following aspects:

the method in the present application supports flexible duplex modes configured individually per band, providing frequency-domain coordination capabilities to reduce self-interference and cross-link interference, improving transmission performance and reducing the impact on legacy users;

the method in the present application provides more flexible link direction configuration while reducing interference, thereby increasing the scheduling flexibility and improving the resource utilization;

the method in the present application takes into account the self-interference and cross-link interference incurred by neighbor channel leakage brought by flexible duplexing as well as the flexibility of the configuration, which balances the interference suppression and scheduling flexibility to optimize the system performance;

the method in the present application determines whether the link direction of the legacy configuration can be overridden according to a relation between a frequency band supporting flexible duplex and an initial BWP or a default BWP or a relation between center frequency of comprised uplink and downlink BWPs, thus avoiding impact on the legacy transmissions and guaranteeing the backward compatibility of the system.

the method in the present application supports a slot format in which an uplink time-domain symbol is earlier than a downlink time-domain symbol, so that it can more flexibly support the configuration of link direction, maximize the scheduling freedom of flexible duplex, and further improve the resource utilization rate and system performance.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
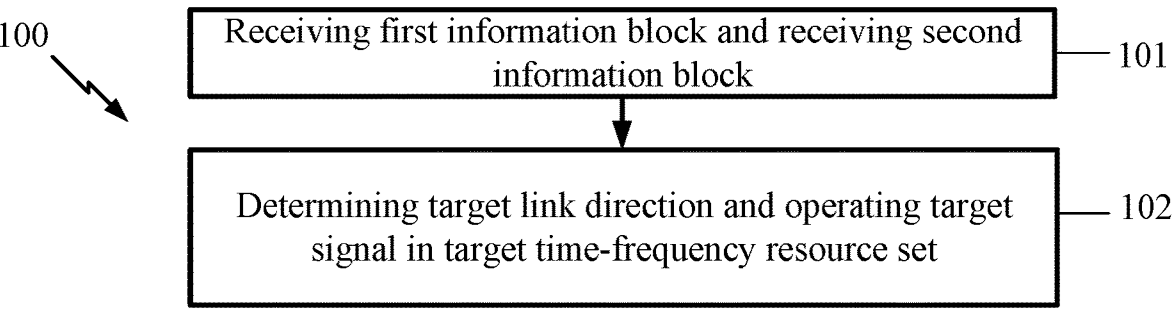
FIG. 1 illustrates a flowchart of a first information block, a second information block and a target signal according to one embodiment of the present application.

Embodiment 1 illustrates a flowchart 100 of a first information block, a second information block and a target signal according to one embodiment of the present application, as shown in FIG. 1. In FIG. 1, each box represents a step. It is particularly important to emphasize that an order of the individual boxes in the figure does not limit the chronological relation between the steps represented.

In embodiment 1, a first node in the present application receives a first information block and receives a second information block in step 101, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; the first node in the present application determines a target link direction and operates a target signal in a target time-frequency resource set in step 102, the target time-frequency resource set comprises at least one time-domain symbol in time domain, a link direction of any time-domain symbol comprised in the target time-frequency resource set in time domain is the target link direction, and the operation is receiving or the operation is transmitting; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

In one embodiment, the first information block is before the second information block.

In one embodiment, the first information block is after the second information block.

In one embodiment, the first information block and the second information block are different.

In one embodiment, the first information block and the second information block are transmitted through two different physical channels.

In one embodiment, a physical channel carrying the first information block and a physical channel carrying the second information block occupy different time-frequency resources.

In one embodiment, the first information block is transmitted through a Physical Downlink Shared Channel (PDSCH), the second information block is transmitted through a Physical Downlink Shared Channel (PDSCH), and a PDSCH carrying the first information block and a PDSCH carrying the second information block occupy different time-frequency resources.

In one embodiment, the first information block comprises configuration of higher-layer information or higher-layer parameter.

In one embodiment, the first information block comprises one or more Information Elements (IEs) comprised in a Radio Resource Control (RRC) layer signaling, or the first information block comprises one or more fields comprised in an RRC-layer signaling.

In one embodiment, the first information block comprises partial or all fields comprised in a Master Information Block (MIB).

In one embodiment, the first information block comprises partial or all fields comprised in a System Information Block (SIB).

In one embodiment, the first information block comprises partial or all fields comprised in SIB 1.

In one embodiment, the first information block comprises partial or all fields comprised in Remaining Minimum System Information (RMSI).

In one embodiment, the first information block is UE specific or UE dedicated.

In one embodiment, a configuration of a link direction comprised in the first information block is bandwidth Part (BWP) common.

In one embodiment, a configuration of a link direction comprised in the first information block is cross-BWP applicable.

In one embodiment, the first information block is Cell Common.

In one embodiment, the first information block is Cell specific.

In one embodiment, the first information block is Group Common.

In one embodiment, a configuration of a link direction comprised in the first information block is applicable to an entire frequency band occupied by a serving cell to which it belongs.

In one embodiment, a configuration of a link direction comprised in the first information block is applicable to an entire carrier to which it belongs.

In one embodiment, the first information block comprises physical-layer control information or physical-layer control parameters.

In one embodiment, the first information block comprises partial or all fields in a Downlink Control Information (DCI) format.

In one embodiment, the first information block is transmitted through a Physical Downlink Control Channel (PDCCH).

In one embodiment, the first information block comprises partial or all fields in IE "tdd UL-DL ConfigCommon".

In one embodiment, the first information block comprises partial or all fields in IE "tdd-UL-DL-ConfigDedicated".

In one embodiment, the first information block comprises partial or all fields in DCI format 2_0.

In one embodiment, the second information block comprises configuration of higher-layer information or higher-layer parameter.

In one embodiment, the second information block comprises one or more IEs comprised in an RRC-layer signaling, or the second information block comprises one or more fields comprised in an RRC-layer signaling.

In one embodiment, the second information block comprises partial or all fields comprised in an SIB.

In one embodiment, the second information block comprises partial or all fields comprised in SIB 1.

In one embodiment, the second information block comprises partial or all fields comprised in an RMSI.

In one embodiment, a configuration of a link direction comprised in the second information block is only applicable to one BWP.

In one embodiment, a configuration of a link direction comprised in the second information block is common to multiple BWPs.

In one embodiment, a configuration of a link direction comprised in the second information block is cross-BWP applicable.

In one embodiment, a configuration of a link direction comprised in the second information block is only applicable to the target sub-band.

In one embodiment, a configuration of a link direction comprised in the second information block is applicable to the target sub-band and at least one sub-band other than the target sub-band.

In one embodiment, a configuration of a link direction comprised in the second information is applicable to a sub-band set, the target sub-band is a sub-band comprised in the sub-band set, and the sub-band set comprises at least one sub-band. In one subsidiary embodiment of the above embodiment, the sub-band set is configurable, or the sub-band set is pre-defined. In one subsidiary embodiment of the above embodiment, any sub-band comprised in the sub-band set is a BWP.

In one embodiment, the second information block is Cell Common.

In one embodiment, the second information block is Cell specific.

In one embodiment, the second information block is Group Common.

In one embodiment, the second information block is UE specific or UE dedicated.

In one embodiment, the second information is configured per sub-band.

In one embodiment, the second information block is configured per BWP.

In one embodiment, the second information block comprises partial or all fields in IE "tdd-UL-DL-ConfigDedicated".

In one embodiment, the second information block comprises an IE "BWP-Flexible".

In one embodiment, the second information block comprises a field IE "flexibleBWP-ToAddModList".

In one embodiment, the second information block comprises an IE "BWP-duplex".

In one embodiment, the second information block comprises a field IE "duplexBWP-ToAddModList".

In one embodiment, the second information block comprises partial or all fields in DCI format 2_0.

In one embodiment, the expression in the claim that the first information block is used to determine X1 time-domain symbols corresponding to a first link direction comprises the following meaning: the first information block is used by the first node in the present application to determine the X1 time-domain symbols corresponding to the first link direction.

In one embodiment, the expression in the claim that the first information block is used to determine X1 time-domain symbols corresponding to a first link direction comprises the following meaning: all or part comprised in the first information block is used to explicitly or implicitly indicate the X1 time-domain symbols corresponding to the link direction.

In one embodiment, the expression in the claim that the first information block is used to determine X1 time-domain symbols corresponding to a first link direction comprises the following meaning: the first information block is used to indicate the X1 time-domain symbols and the first information block is used to indicate that the X1 time-domain symbols correspond to the first link direction.

In one embodiment, the expression in the claim that the first information block is used to determine X1 time-domain symbols corresponding to a first link direction comprises the following meaning: the first information block is used to indicate a number of time-domain symbol(s) corresponding to the first link direction within a time window.

In one embodiment, the expression in the claim that the first information block is used to determine X1 time-domain symbols corresponding to a first link direction comprises the following meaning: the first information block is used to indicate that a number of time-domain symbol(s) corresponding to the first link direction within a time window is equal to the X1, and the X1 time-domain symbols are earliest or latest X1 time-domain symbols within a time window to which they belong.

In one embodiment, the expression in the claim that the first information block is used to determine X1 time-domain symbols corresponding to a first link direction is implemented through claim 2 in the present application.

In one embodiment, the first information block comprises a default configuration for a link direction of the X1 time-domain symbols.

In one embodiment, an actual link direction of transmission that occupies at least one of the X1 time-domain symbols in time domain is the first link direction.

In one embodiment, actual link directions for transmissions occupying at least one of the X1 time-domain symbols in time domain and where an occupied subcarrier in frequency domain belongs to a sub-band other than the target sub-band are all in the first link direction.

In one embodiment, an actual link direction of a transmission that occupies at least one of the X1 time-domain symbols in time domain is not necessarily the first link direction.

In one embodiment, each of the X1 time-domain symbols is configured by the first information block to adopt a time-domain symbol of the first link direction.

In one embodiment, when configuration of a link direction comprised in the first information block is not overridden, an actual link direction of a transmission occupying at least one of the X1 time-domain symbols in time-domain is the first link direction.

In one embodiment, a link direction of each of the X1 time-domain symbols in which a link direction is not overridden is the first link direction.

In one embodiment, a link direction of a time-domain symbol whose link direction is overridden among the X1 time-domain symbols is determined by a configuration of overridden.

In one embodiment, the first link direction is a link direction indicated by the first information block for the X1 time-domain symbols, and an actual link direction of a transmission occupying at least one of the X1 time-domain symbols in time domain is related to whether occupied time-domain symbol is overridden by another configuration and/or whether occupied subcarrier in frequency domain belongs to the target sub-band.

In one embodiment, the X1 time-domain symbols corresponding to the first link direction refers to: a link direction of the X1 time-domain symbols configured by the first information block is the first link direction, and an actual link direction of a transmission occupying at least one of the X1 time-domain symbols in time domain is not necessarily the first link direction.

In one embodiment, the X1 time-domain symbols corresponding to the first link direction refers to: link directions that the X1 time-domain symbols configured by the first information block to be associated with or correspond to is the first link direction.

In one embodiment, the X1 time-domain symbols corresponding to the first link direction refers to: the first link direction is a candidate link direction for at least one of the X1 time-domain symbols.

In one embodiment, the X1 time-domain symbols corresponding to the first link direction refers to: the first link direction is a possible link direction for at least one of the X1 time-domain symbols.

In one embodiment, the X1 time-domain symbols corresponding to the first link direction refers to: a candidate link direction of at least one of the X1 time-domain symbols comprises the first link direction.

In one embodiment, the expression in the claim that the second information block is used to determine X2 time-domain symbols corresponding to a second link direction comprises the following meaning: the second information block is used by the first node in the present application to determine the X2 time-domain symbols corresponding to the second link direction.

In one embodiment, the expression in the claim that the second information block is used to determine X2 time-domain symbols corresponding to a second link direction comprises the following meaning: all or part comprised in the second information block is used to explicitly or implicitly indicate the X2 time-domain symbols corresponding to the second link direction.

In one embodiment, the expression in the claim that the second information block is used to determine X2 time-domain symbols corresponding to a second link direction comprises the following meaning: the second information block is used to indicate the X2 time-domain symbols and the second information block is used to indicate that the X2 time-domain symbols corresponding to the second link direction.

In one embodiment, the expression in the claim that the second information block is used to determine X2 time-domain symbols corresponding to a second link direction comprises the following meaning: the second information block is used to indicate a number of time-domain symbol(s) corresponding to the second link direction within a time window.

In one embodiment, the expression in the claim that the second information block is used to determine X2 time-domain symbols corresponding to a second link direction comprises the following meaning: the second information block is used to indicate a number of time-domain symbol(s) corresponding to the second link direction in each of one or more slots.

In one embodiment, the expression in the claim that the second information block is used to determine X2 time-domain symbols corresponding to a second link direction comprises the following meaning: the second information block is used to indicate a number of time-domain symbol(s) corresponding to the second link direction in each of one or more slots, and a total number of time-domain symbols corresponding to the second link direction in the one or more slots is equal to the X2.

In one embodiment, the expression in the claim that the second information block is used to determine X2 time-domain symbols corresponding to a second link direction is implemented through claim 5 of the present application.

In one embodiment, the expression in the claim that the second information block is used to determine X2 time-domain symbols corresponding to a second link direction comprises the following meaning: the second information block is used to indicate a Slot Format for each slot in one or more slots, and according to a slot format indicated by the second information block, a total number of time-domain symbols corresponding to the second link direction in the one or more slots is equal to the X2.

In one embodiment, the expression in the claim that the second information block is used to determine X2 time-domain symbols corresponding to a second link direction comprises the following meaning: the second information block is used to indicate a Slot Format of each slot comprised in a slot set to which the X2 time-domain symbols belong.

In one embodiment, the second information block comprises a default configuration for a link direction of the X2 time-domain symbols.

In one embodiment, an actual link direction of a transmission that occupies at least one of the X2 time-domain symbols in time domain is the second link direction.

In one embodiment, an actual link direction of a transmission that occupies at least one of the X2 time-domain symbols in time domain and resources occupied in frequency domain belong to the target sub-band is the second link direction.

In one embodiment, an actual link direction of a transmission that occupies at least one of the X2 time-domain symbols in time domain is not necessarily the second link direction.

In one embodiment, each of the X2 time-domain symbols is configured by the second information block to adopt a time-domain symbol of the second link direction.

In one embodiment, when a configuration of a link direction comprised in the second information block is not overridden, an actual link direction of a transmission occupying at least one of the X2 time-domain symbols in time-domain is the second link direction.

In one embodiment, when a configuration of a link direction comprised in the second information block is not overridden, an actual link direction of a transmission occupying at least one of the X2 time-domain symbols in time-domain and a subcarrier occupied in frequency domain belonging to the target sub-band is the second link direction.

In one embodiment, a link direction of a transmission occupying the X2 time-domain symbols in time domain and a sub-subcarrier occupied in frequency domain belonging to the target sub-band is the second link direction.

In one embodiment, a link direction of a time-domain symbol whose link direction is overridden among the X2 time-domain symbols is determined by the configuration of overridden.

In one embodiment, the second link direction is a link direction indicated by the second information block for the X2 time-domain symbols, where an actual link direction of a transmission in time domain occupying at least one of the X2 time-domain symbols is related to whether occupied time-domain symbol is overridden by another configuration.

In one embodiment, the second link direction is a link direction indicated by the second information block for the X2 time-domain symbols, and an actual link direction of a transmission in time domain occupying at least one of the X2 time-domain symbols is related to whether occupied time-domain symbols are overridden by other configurations and/or whether an occupied subcarrier in frequency domain belongs to the target sub-band.

In one embodiment, the X2 time-domain symbols corresponding to the second link direction refers to: a link direction of the X2 time-domain symbols configured by the second information block is the second link direction, and an actual link direction of a transmission occupying at least one of the X2 time-domain symbols in time domain is not necessarily the second link direction.

In one embodiment, the X2 time-domain symbols corresponding to the second link direction refers to: a link direction that the X2 time-domain symbols configured by the second information block to be associated with or corresponded to is the second link direction.

In one embodiment, the X2 time-domain symbols corresponding to the second link direction refers to: the second link direction is a candidate link direction for at least one of the X2 time-domain symbols.

In one embodiment, the X2 time-domain symbols corresponding to the second link direction refers to: the second link direction is a possible link direction for at least one of the X2 time-domain symbols.

In one embodiment, the X2 time-domain symbols corresponding to the second link direction refers to: a candidate link direction of at least one of the X2 time-domain symbols comprises the second link direction.

In one embodiment, X1 is related to a subcarrier spacing of a subcarrier occupied by the target signal in frequency domain.

In one embodiment, X1 is proportional to an index of a subcarrier spacing of a subcarrier occupied by the target signal in frequency domain.

In one embodiment, X2 is related to a subcarrier spacing of a subcarrier occupied by the target signal in frequency domain.

In one embodiment, X2 is proportional to an index of a subcarrier spacing of a subcarrier occupied by the target signal in frequency domain.

In one embodiment, the target link direction is one of the Uplink, Downlink, or Flexible link.

In one embodiment, the target link direction is one of the Uplink or Downlink.

In one embodiment, when the target link direction is uplink, the operation is transmitting; when the target link direction is downlink, the operation is receiving; when the target link method is a flexible link, whether the operation is receiving or transmitting is determined by scheduling or configuration information of the target signal.

In one embodiment, when the target link direction is uplink, the operation is transmitting; when the target link direction is downlink, the operation is receiving.

In one embodiment, the target time-frequency resource set comprises at least one Resource Element (RE).

In one embodiment, the target time-frequency resource set comprises at least one PRB in frequency domain; the target time-frequency resource set comprises at least one Orthogonal Frequency Division Multiplexing (OFDM) symbol in time domain.

In one embodiment, the target time-frequency resource set comprises at least one subcarrier in frequency domain; the target time-frequency resource set comprises at least one Orthogonal Frequency Division Multiplexing (OFDM) symbol in time domain.

In one embodiment, the target time-frequency resource set comprises consecutive frequency-domain resources in frequency domain.

In one embodiment, the target time-frequency resource set comprises discrete frequency-domain resources in frequency domain.

In one embodiment, the target time-frequency resource set comprises frequency-domain resources that use frequency hopping in frequency domain.

In one embodiment, the target time-frequency resource set comprises frequency-domain resources for each hop when using frequency hopping in frequency domain.

In one embodiment, the target time-frequency resource set comprises consecutive time-domain resources in time domain.

In one embodiment, the target time-frequency resource set comprises discrete time-domain resources in time domain.

In one embodiment, the target time-frequency resource set comprises consecutive OFDM symbols in time domain.

In one embodiment, the target time-frequency resource set is configured by a DCI format or higher-layer information.

In one embodiment, the target time-frequency resource set only comprises an RE occupied by the target signal.

In one embodiment, the target time-frequency resource set comprises an RE other than an RE occupied by the target signal.

In one embodiment, the target signal is either a baseband signal or a radio frequency signal.

In one embodiment, the target signal is transmitted via an air interface or a radio interface.

In one embodiment, the target signal carries an Uplink Shared Channel (UL-SCH).

In one embodiment, the target signal is transmitted through a Physical Uplink Shared Channel (PUSCH).

In one embodiment, the target signal comprises a Configured Grant (CG) PUSCH.

In one embodiment, the target signal comprises a PUSCH and a Demodulation Reference Signal (DMRS).

In one embodiment, the target signal is transmitted through a Physical Uplink Control Channel.

In one embodiment, the target signal comprises a PUCCH and a DMRS.

In one embodiment, the target signal comprises a Sounding Reference Signal (SRS).

In one embodiment, the target signal comprises a Physical Random Access Channel (PRACH) configured by a PDCCH order.

In one embodiment, the target signal carries Msg3 (Message 3) or MsgA (Message A)

In one embodiment, when the operation is transmitting or the target link direction is uplink, the target signal comprises at least one of a PUSCH, a PUCCH, an SRS, or an uplink DMRS.

In one embodiment, the target signal carries a DL-SCH (Downlink Shared Channel).

In one embodiment, the target signal is transmitted through a Physical Downlink Shared Channel (PDSCH).

In one embodiment, the target signal comprises an SPS (Semi Persistent Scheduling) PDSCH.

In one embodiment, the target signal comprises a PDSCH and a DMRS.

In one embodiment, the target signal is transmitted through a Physical Downlink Control Channel (PDCCH).

In one embodiment, the target signal comprises a PDCCH and a DMRS.

In one embodiment, the target signal comprises a CSI-RS (Channel Status Information Reference Signal).

In one embodiment, the target signal carries a Random Access Response (RAR) or MsgB (Message B).

In one embodiment, when the operation is receiving or the target link direction is downlink, the target signal comprises at least one of a PDSCH, a PDCCH, a CSI-RS, a downlink DMRS, a PRS (Positioning Reference Signal).

In one embodiment, the target signal occupies all or partial REs comprised in the target time-frequency resource set.

In one embodiment, any time-domain symbol comprised in the target time-frequency resource set in time domain is an OFDM symbol.

In one embodiment, any time-domain symbol comprised in the target time-frequency resource set in time domain is a DFT-s-OFDM symbol.

In one embodiment, when the target time-frequency resource set comprises more than one time-domain symbol in time domain, link directions of any two time-domain symbols comprised in the target time-frequency resource set are the same.

In one embodiment, a link direction of a time-domain symbol comprised in the target time-frequency resource set is a reserved link direction of a time-domain symbol comprised in the target time-frequency resource set.

In one embodiment, a link direction of a time-domain symbol comprised in the target time-frequency resource set is a candidate link direction that occupies a signal or channel of a time-domain symbol comprised in the target time-frequency resource set.

In one embodiment, a link direction of a time-domain symbol comprised in the target time-frequency resource set is a possible link direction that occupies a signal or channel of a time-domain symbol comprised in the target time-frequency resource set.

In one embodiment, a link direction of a time-domain symbol comprised in the target time-frequency resource set is a candidate link direction of an occupied signal or channel when a time-domain symbol comprised in the target time-frequency resource set is occupied.

In one embodiment, a link direction of a time-domain symbol comprised in the target time-frequency resource set is a link direction in which a time-domain symbol comprised in the target time-frequency resource set is scheduled or configured.

In one embodiment, a link direction of a time-domain symbol comprised in the target time-frequency resource set is an actual link direction of a time-domain symbol comprised in the target time-frequency resource set.

In one embodiment, a link direction of a time-domain symbol comprised in the target time-frequency resource set is an actual link direction when a time-domain symbol comprised in the target time-frequency resource set is occupied.

In one embodiment, when a link direction of a time-domain symbol comprised in the target time-frequency resource set is uplink or downlink, a link direction of an actual transmission of a signal or channel occupying at least one time-domain symbol comprised in the target time-frequency resource set is the same as a link direction of a time-domain symbol comprised in the target time-frequency resource set; when a link direction of a time-domain symbol comprised in the target time-frequency resource set is a flexible link, a link direction of the actual transmission of a signal or channel occupying at least one time-domain symbol comprised in the target time-frequency resource set is determined by corresponding scheduling or indication information.

In one embodiment, any of the X1 time-domain symbols is an OFDM symbol.

In one embodiment, any of the X1 time-domain symbols is a DFT-s-OFDM symbol.

In one embodiment, any of the X1 time-domain symbols comprises a cyclic prefix (CP) and a data portion.

In one embodiment, any of the X2 time-domain symbols is an OFDM symbol.

In one embodiment, any of the X2 time-domain symbols is a DFT-s-OFDM symbol.

In one embodiment, any of the X2 time-domain symbols comprises a cyclic prefix (CP) and a data portion.

In one embodiment, the X1 time-domain symbols overlap with the X2 time-domain symbols in time domain.

In one embodiment, there exists one of the X1 time-domain symbols being one of the X2 time-domain symbols.

In one embodiment, there exists at least one overlapping time-domain symbol between the X1 time-domain symbols and the X2 time-domain symbols.

In one embodiment, there exists one of the X2 time-domain symbols being one of the X1 time-domain symbols.

In one embodiment, there exists one time-domain symbol simultaneously belonging to the X1 time-domain symbols and the X2 time-domain symbols.

In one embodiment, the X1 time-domain symbols are orthogonal to the X2 time-domain symbols in time domain.

In one embodiment, there exists no overlapping time-domain symbol between the X1 time-domain symbols and the X2 time-domain symbols.

In one embodiment, there exists no time-domain symbol simultaneously belonging to the X1 time-domain symbols and the X2 time-domain symbols.

In one embodiment, X1 is equal to the X2.

In one embodiment, X1 is greater than the X2.

In one embodiment, X1 is less than the X2.

In one embodiment, any time-domain symbol comprised in the target time-frequency resource set in time domain is one of the X1 time-domain symbols.

In one embodiment, a time-domain symbol comprised in the target time-frequency resource set in time domain is a time-domain symbol other than the X1 time-domain symbols.

In one embodiment, any time-domain symbol comprised in the target time-frequency resource set in time domain is one of the X2 time-domain symbols.

In one embodiment, a time-domain symbol comprised in the target time-frequency resource set in time domain is a time-domain symbol other than the X2 time-domain symbols.

In one embodiment, the target time-frequency resource set comprises a time-domain symbol in time domain simultaneously belonging to the X1 time-domain symbols and the X2 time-domain symbols.

In one embodiment, any time-domain symbol comprised in the target time-frequency resource set in time domain at most can belong to one of the X1 time-domain symbols or the X2 time-domain symbols.

In one embodiment, the target time-frequency resource set does not comprise one time-domain symbol in time domain simultaneously belonging to the X1 time-domain symbols and the X2 time-domain symbols.

In one embodiment, a subcarrier spacing of any subcarrier comprised in the target time-frequency resource set in frequency domain is a non-negative integer power multiple of 2 times 15 kHz.

In one embodiment, a subcarrier spacing of any subcarrier comprised in the target time-frequency resource set in frequency domain is configured by a configuration signaling of the target sub-band.

In one embodiment, configuration information of the target sub-band comprises a subcarrier spacing of any subcarrier comprised in the target time-frequency resource set in frequency domain.

In one embodiment, a subcarrier spacing of any subcarrier comprised in the target time-frequency resource set in frequency domain is configured by a specific configuration signaling of the target sub-band.

In one embodiment, a subcarrier spacing of any subcarrier comprised in the target time-frequency resource set in frequency domain is configured by a configuration signaling of a BWP to which a subcarrier comprised in the target time-frequency resource set belongs.

In one embodiment, the target sub-band is a BWP.

In one embodiment, the target sub-band is a downlink BWP or an uplink BWP.

In one embodiment, the target sub-band is a BWP with a larger bandwidth between uplink BWP and downlink BWP corresponding to a same BWP ID.

In one embodiment, when the operation is receiving, the target sub-band is a downlink BWP; when the operation is transmitting, the target sub-band is an uplink BWP; BWP IDs of the downlink BWP and the uplink BWP are the same.

In one embodiment, the target sub-band is a sub-band that supports flexible duplex.

In one embodiment, the target sub-band is a BWP that supports flexible duplex.

In one embodiment, the target sub-band is a BWP that supports both uplink and downlink simultaneously.

In one embodiment, the target sub-band is a BWP in a flexible link direction.

In one embodiment, the target sub-band comprises at least one BWP.

In one embodiment, the target sub-band consists of multiple BWPs.

In one embodiment, the target sub-band comprises at least one subcarrier.

In one embodiment, the target sub-band comprises at least one PRB.

In one embodiment, all subcarriers comprised in the target sub-band belong to a same BWP.

In one embodiment, a BWP comprises the target sub-band.

In one embodiment, the target sub-band comprises two subcarriers respectively belonging to different BWPs.

In one embodiment, the target sub-band is within a BWP.

In one embodiment, the target sub-band can span two different BWPs.

In one embodiment, the target sub-band consists of frequency-domain resources comprised in the target time-frequency resource set.

In one embodiment, the target sub-band is continuous frequency-domain resources occupied by the target time-frequency resource set.

In one embodiment, the target sub-band comprises multiple subcarriers, and a subcarrier spacing of any two subcarriers comprised in the target sub-band is equal.

In one embodiment, the target sub-band comprises multiple subcarriers, and a subcarrier spacing of two subcarriers comprised in the target sub-band is not equal.

In one embodiment, the target sub-band comprises continuous frequency-domain resources.

In one embodiment, the target sub-band comprises discrete frequency-domain resources.

In one embodiment, the target sub-band comprises a guard subcarrier or a PRB.

In one embodiment, the target sub-band comprises a subcarrier or a PRB that is not available for transmission or allocation.

In one embodiment, configuration information of the target sub-band comprises a type of a sub-band set to which the target sub-band belongs.

In one embodiment, configuration information of the target sub-band comprises a type of a BWP set to which the target sub-band belongs.

In one embodiment, configuration information of the target sub-band comprises a duplex type of a sub-band set to which the target sub-band belongs.

In one embodiment, configuration information of the target sub-band comprises a duplex type of a BWP set to which the target sub-band belongs.

In one embodiment, configuration information of the target sub-band comprises whether the target sub-band belongs to a sub-band set supporting multiple link directions.

In one embodiment, configuration information of the target sub-band comprises whether the target sub-band belongs to a BWP set supporting multiple link directions.

In one embodiment, configuration information of the target sub-band comprises whether the target sub-band belongs to a sub-band set of Flexible Duplex.

In one embodiment, configuration information of the target sub-band comprises whether the target sub-band belongs to a BWP set of Flexible Duplex.

In one embodiment, configuration information of the target sub-band comprises whether the target sub-band belongs to a sub-band set in which the second information block overrides the first information block.

In one embodiment, configuration information of the target sub-band comprises whether the target sub-band belongs to a BWP set in which the second information block overrides the first information block.

In one embodiment, the configuration information of the target sub-band comprises at least one of location information of the target sub-band in frequency domain or a link direction indication of the target sub-band.

In one embodiment, configuration information of the target sub-band comprises at least one of location information of the target sub-band in frequency domain, link direction indication of the target sub-band, subcarrier spacing indication, starting CRB (Common Resource Block) indication, a number of comprised CRBs, and an index list of the comprised BWP.

In one embodiment, configuration information of the target sub-band comprises at least one of location information of the target sub-band in frequency domain, a link direction indication of the target sub-band, a subcarrier spacing indication, a location of a starting PRB in a BWP to which the target sub-band belongs, a number of PRBs comprised, or an index or identifier of a BWP to which the target sub-band belongs.

In one embodiment, configuration information of the target sub-band comprises at least one of location information of the target sub-band in frequency domain, a link direction indication of the target sub-band, a subcarrier spacing indication, a location of a starting PRB in a BWP to which it belongs to, a location of an ending PRB in a BWP to which it belongs to, an index or identifier of a BWP to which the starting PRB belongs, or an index or identifier of a BWP to which an ending PRB belongs.

In one embodiment, configuration information of the target sub-band is configuration information of the target time-frequency resource set.

In one embodiment, configuration information of the target time-frequency resource set comprises configuration information of the target sub-band.

In one embodiment, configuration information of the target sub-band is scheduling information of the target signal.

In one embodiment, configuration information of the target sub-band is information for scheduling the target time-frequency resource set.

In one embodiment, configuration information of the target sub-band is configured by the target sub-band dedicated signaling.

In one embodiment, configuration information of the target sub-band is configured by a signaling dedicated to a sub-band group to which the target sub-band belongs.

In one embodiment, configuration information of the target sub-band is configured by a configuration signaling configured for per sub-band.

In one embodiment, the expression in the claim that configuration information of the target sub-band is used to determine the target link direction comprises the following meaning: configuration information of the target sub-band is used by the first node device in this application to determine the direction of the target link.

In one embodiment, the expression in the claim that configuration information of the target sub-band is used to determine the target link direction comprises the following meaning: configuration information of the target sub-band is used to explicitly or implicitly indicate the target link direction.

In one embodiment, the expression in the claim that configuration information of the target sub-band is used to determine the target link direction comprises the following meaning: configuration information of the target sub-band is used to determine the target link direction between the first link direction and the second link direction.

In one embodiment, the expression in the claim that configuration information of the target sub-band is used to determine the target link direction comprises the following meaning: configuration information of the target sub-band is used to determine whether the target link direction is the first link direction or the second link direction.

In one embodiment, the expression in the claim that configuration information of the target sub-band is used to determine the target link direction is achieved through claim 3 in the present application.

In one embodiment, the expression in the claim that configuration information of the target sub-band is used to determine the target link direction is implemented through claim 4 in the present application.

In one embodiment, the expression in the claim that configuration information of the target sub-band is used to determine the target link direction is implemented together with claim 3 and claim 4 in the present application.

In one embodiment, the expression in the claim that configuration information of the target sub-band is used to determine the target link direction comprises the following meaning: configuration information of the target sub-band is used to determine a value of a target parameter, and the value of the target parameter is used to determine the target link direction.

In one embodiment, the expression in the claim that configuration information of the target sub-band is used to determine the target link direction comprises the following meaning: configuration information of the target sub-band is used to determine a value of a target parameter; a size relation between a value of the target parameter and a predefined threshold is used to determine the target link direction.

In one embodiment, the expression in the claim that configuration information of the target sub-band is used to determine the target link direction comprises the following meaning: one or multiple fields comprised in a configuration signaling of the target sub-band are used to determine the target link direction.

Embodiment 2

Figure 2:
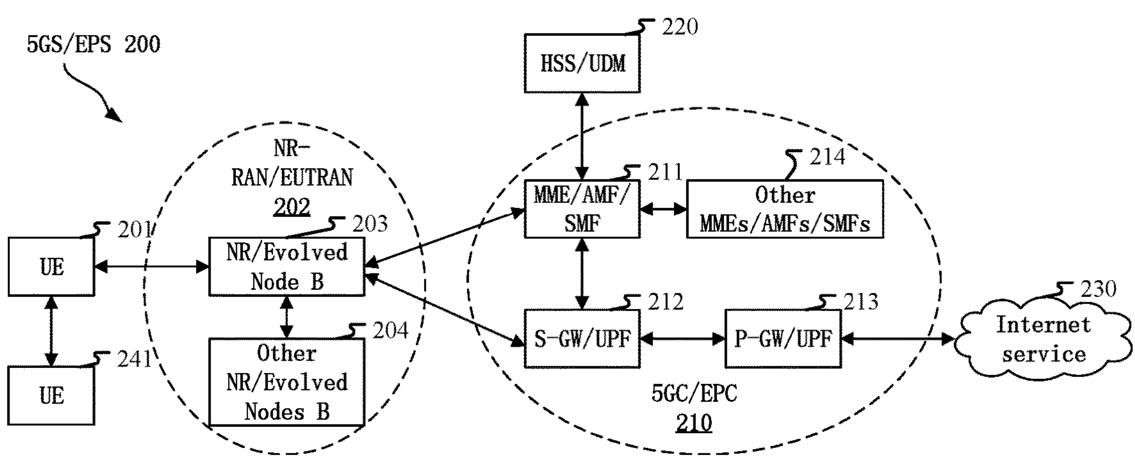
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB (eNB) 203 may be connected to other gNBs (eNBs) 204 via an Xn/X2 interface (e.g., backhaul). The gNB (eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB (eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, test devices, test instrumentation, test tools or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB (eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports transmission of flexible duplex mode.

In one embodiment, the gNB (eNB) 201 corresponds to the second node in the present application.

In one embodiment, the gNB (eNB) 201 supports transmission of flexible duplex mode.

Embodiment 3

Figure 3:
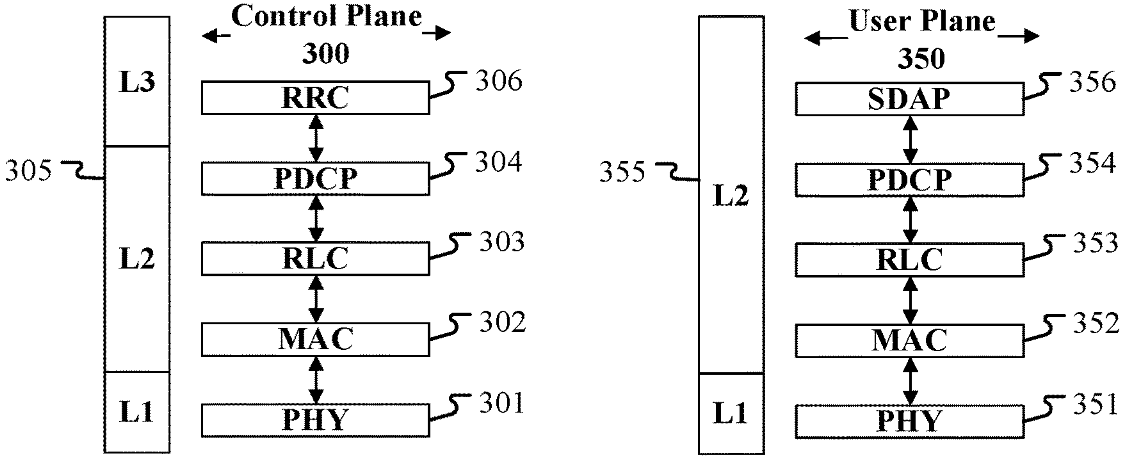
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information block in the present application is generated by the RRC 306, or MAC 302, or MAC 352, or the PHY 301, or PHY 351.

In one embodiment, the second information block in the present application is generated by the RRC 306, or MAC 302, or MAC 352, or the PHY 301, or PHY 351.

In one embodiment, the target signal in the present application is generated by the RRC 306, or MAC 302, or MAC 352, or the PHY 301, or PHY 351.

In one embodiment, the first signaling in the present application is generated by the RRC 306, or MAC 302, or MAC 352, or the PHY 301, or PHY 351.

In one embodiment, the third information block in the present application is generated by the RRC 306, or MAC 302, or MAC 352, or the PHY 301, or PHY 351.

Embodiment 4

Figure 4:
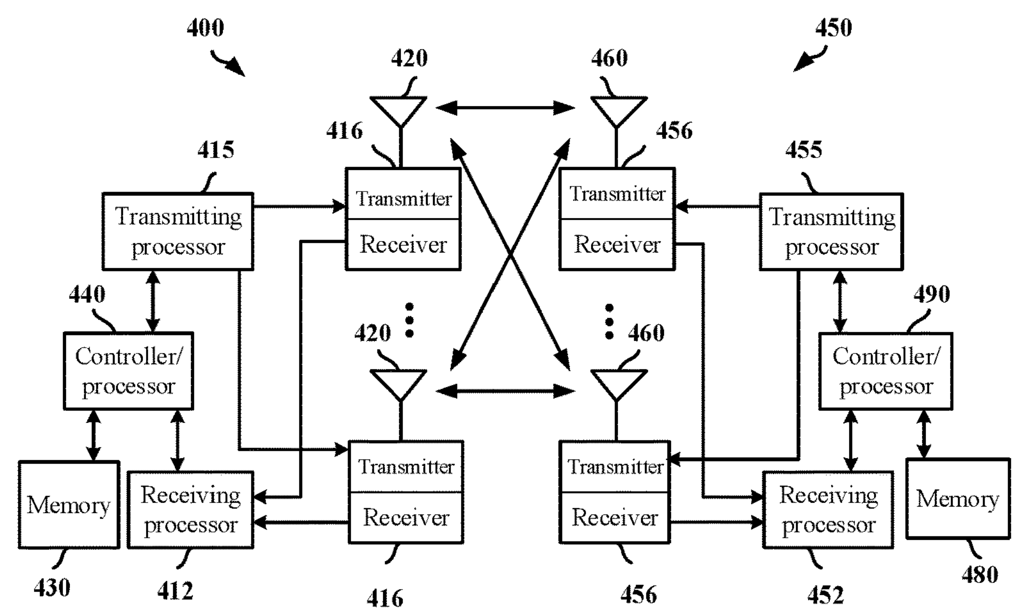
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In Downlink (DL) transmission, a higher packet is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also responsible for HARQ operation, re-transmission of lost packets, and a high-layer signaling to the first node 450. The first information block, the second information block, the third information block in the present application and the higher-layer information carried by the target signal (when the target signal is transmitted downlink) are generated at the controller/processor 440. The transmitting processor 415 implements various signal processing functions for the L1 layer (i.e., the physical layer), including encoding, interweaving, scrambling, modulation, power control/distribution, precoding, and physical layer control signaling generation, for example, the generation of the physical-layer signal carrying a first information block, the physical-layer signal carrying a second information block, the physical-layer signal carrying a third information block, the physical-layer signal of a target signal (when the target signal is transmitted downlink) and the first signaling in the present application are completed at the transmitting processor 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function comprises receiving the physical-layer signal carrying the first information block in the present application, the physical-layer signal carrying the second information block in the present application, the physical-layer signal carrying the third information block in the present application, the physical-layer signal of the target signal in the present application (when the target signal is transmitted downlink) and the first signaling in the present application. Demodulation based on various modulation schemes (e.g., binary phase shift keying (BPSK), Quadrature phase shift keying (QPSK)) through multi-carrier symbols in the multi-carrier symbol stream, followed by decontamination, decoding and de-interleaving to recover data or control transmitted by the second node 410 on the physical channel, and the data and control signals are then provided to the controller/processor 490. The controller/processor 490 is in charge of the function of L2 layer and above layers, and the controller/processor 490 interprets higher layer information; which comprises interpreting the first information block, the second information block, the third information block and higher-layer information carried by the target signal (when the target signal is transmitted downlink) The controller/processor can be connected to a memory 480 that stores program code and data. The memory 480 may be called a computer readable medium.

In uplink (UL) transmission, similar to downlink transmission, the higher-layer information comprises that the higher-layer information carried by the target signal (when the target signal is transmitted uplink) in the present application is generated at the controller/processor 490 and implemented by the transmitting processor 455 for various signal transmission processing functions in the L1 layer (i.e., the physical layer), and the physical-layer signal of the target signal is mapped by the transmitting processor 455 through the transmitter 456 to the antenna 460 in the form of an RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal reception and processing functions for the L1 layer (i.e., the physical layer), including receiving and processing the physical-layer signal carrying the target signal in the present application, and then providing data and/or control signals to the controller/processor 440. The function of implementing L2 layer in the controller/processor 440 comprises interpreting high-layer information such as the higher-layer information carried by the target signal in the present application (when the target signal is transmitted uplink). The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block and receives a second information block, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; determines a target link direction and operates a target signal in a target time-frequency resource set, the target time-frequency resource set comprises at least one time-domain symbol in time domain, a link direction of any time-domain symbol comprised in the target time-frequency resource set in time domain is the target link direction, and the operation is receiving or the operation is transmitting; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

In one embodiment, the first node 450 comprises a memory that stores a computer readable instruction program. The computer readable instruction program generates an action when executed by at least one processor. The action includes: receiving a first information block and receiving a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; determining a target link direction and operating a target signal in a target time-frequency resource set, the target time-frequency resource set comprising at least one time-domain symbol in time domain, a link direction of any time-domain symbol comprised in the target time-frequency resource set in time domain being the target link direction, and the operation being receiving or the operation being transmitting; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block and transmits a second information block, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; determines a target link direction and executes a target signal in a target time-frequency resource set, the target time-frequency resource set comprises at least one time-domain symbol in time domain, a link direction of any time-domain symbol comprised in the target time-frequency resource set in time domain is the target link direction, and the execution is transmitting or the execution is receiving; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

In one embodiment, the second node 410 comprises a memory that stores a computer readable instruction program. The computer readable instruction program generates an action when executed by at least one processor. The action includes: transmitting a first information block and transmitting a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; determining a target link direction and executing a target signal in a target time-frequency resource set, the target time-frequency resource set comprising at least one time-domain symbol in time domain, a link direction of any time-domain symbol comprised in the target time-frequency resource set in time domain being the target link direction, and the execution being transmitting or the execution being receiving; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

In one embodiment, the first node 450 is a UE.

In one embodiment, the first node 450 is a UE supporting transmission of flexible duplex mode.

In one embodiment, the second node 410 is a base station (gNB/eNB).

In one embodiment, the second node 410 is a base station supporting transmission of flexible duplex mode.

In one embodiment, the receiver 456 (including the antenna 460), the receiving processor 452 and the controller/processor 490 are used for receiving the first information block in the present application.

In one embodiment, the receiver 456 (including the antenna 460), the receiving processor 452 and the controller/processor 490 are used for receiving the second information block in the present application.

In one embodiment, when the target signal is transmitted through downlink, the receiver 456 (including the antenna 460), the receiving processor 452, and the controller/processor 490 are used to receive the target signal in the present application.

In one embodiment, when the target signal is transmitted through downlink, the transmitter 456 (including the antenna 460), the transmission processor 455, and the controller/processor 490 are used to transmit the target signal in the present application.

In one embodiment, the receiver 456 (including the antenna 460), the receiving processor 452 and the controller/processor 490 are used for receiving the third information block in the present application.

In one embodiment, the receiver 456 (including the antenna 460) and the receiving processor 452 are used to receive the first signaling in the present application.

In one embodiment, the transmitter 416 (including the antenna 420), the transmitting processor 415 and the controller/processor 440 are used to transmit the first information block in the present application.

In one embodiment, the transmitter 416 (including the antenna 420), the transmitting processor 415 and the controller/processor 440 are used to transmit the second information block in the present application.

In one embodiment, when the target signal is transmitted through downlink, the transmitter 416 (including the antenna 420), the transmitting processor 415, and the controller/processor 440 are used to transmit the target signal in the present application.

In one embodiment, when the target signal is transmitted through uplink, the receiver 416 (including the antenna 420), the receiving processor 412, and the controller/processor 440 are used to receive the target signal in the present application.

In one embodiment, the transmitter 416 (including the antenna 420), the transmitting processor 415 and the controller/processor 440 are used to transmit the third information block in the present application.

In one embodiment, the transmitter 416 (including the antenna 420) and the transmitting processor 415 are used for transmitting the first signaling in the present application.

Embodiment 5

Figure 5:
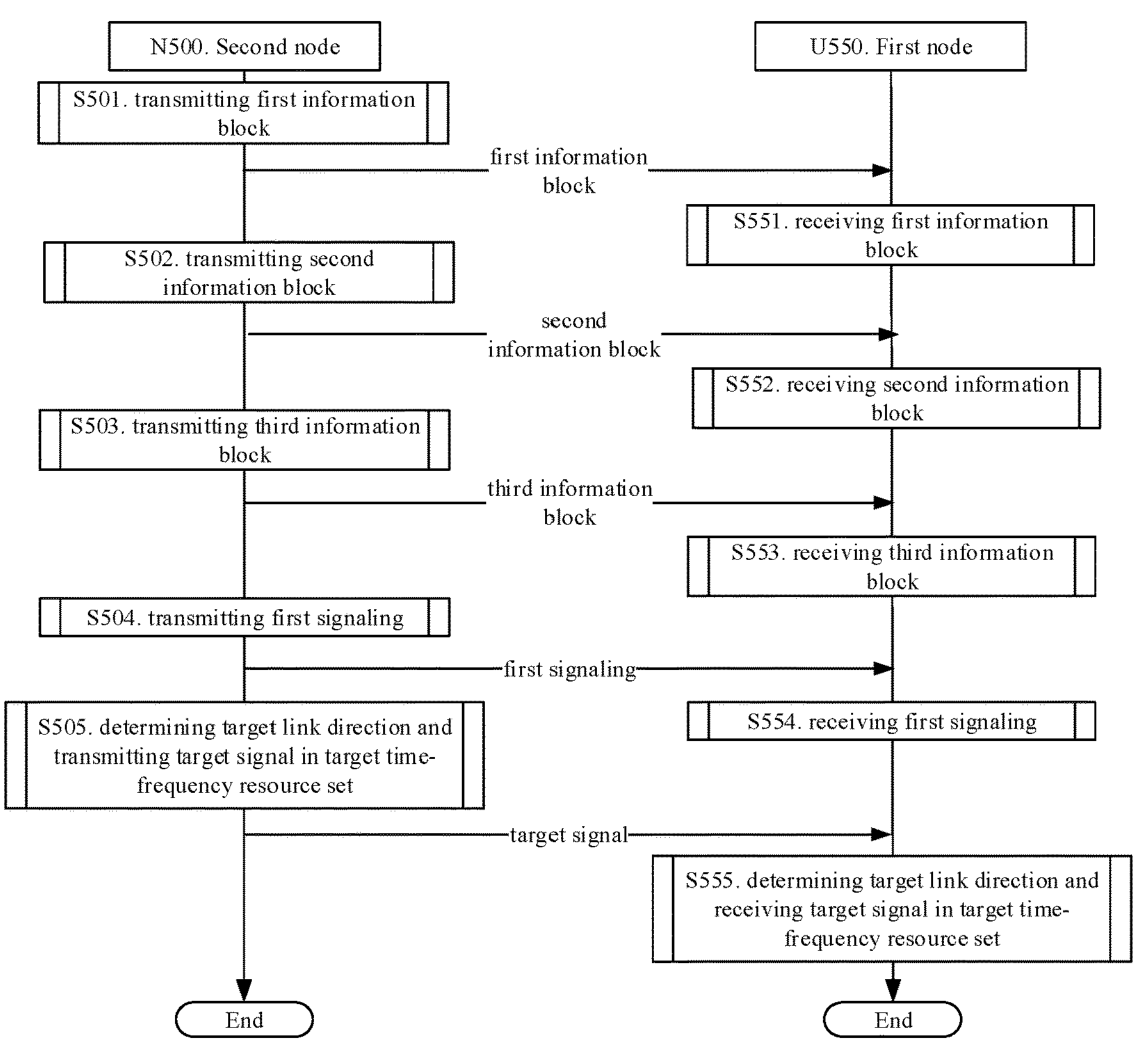
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 transmits a first information block in step S501, transmits a second information block in step S502, transmits a third information block in step S503, transmits a first signaling in step S504, determines a target link direction in step S505, and transmits a target signal in a target time-frequency resource set;

The first node U550 receives a first information block in step S551, receives a second information block in step S552, receives a third information block in step S553, receives a first signaling in step S554, determines a target link direction in step S555, and receives a target signal in a target time-frequency resource set.

In embodiment 5, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; the target time-frequency resource set comprises at least one time-domain symbol in time domain, a link direction of any time-domain symbol comprised in the target time-frequency resource set in time domain is the target link direction; a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction; the third information block is used to determine configuration information of the target sub-band; the first signaling is used to determine the target time-frequency resource set.

In one embodiment, the first information block is before the third information block.

In one embodiment, the first information block is after the third information block.

In one embodiment, the second information block is before the third information block.

In one embodiment, the second information block is after the third information block.

In one embodiment, the second information block and the third information block are carried through a same physical channel.

In one embodiment, the second information block and the third information block are carried through different physical channels.

In one embodiment, the second information block and the third information block are carried through a same PDSCH.

In one embodiment, the second and third information blocks are respectively carried through two different PDSCHs.

In one embodiment, the third information block comprises configuration of higher-layer information or higher-layer parameter.

In one embodiment, the third information block comprises one or multiple IEs (Information Elements) comprised in a Radio Resource Control (RRC) layer signaling, or the third information block comprises one or multiple fields comprised in an RRC-layer signaling.

In one embodiment, the third information block comprises partial or all field comprised in a Master Information Block (MIB).

In one embodiment, the third information block comprises partial or all fields comprised in a System Information Block (SIB).

In one embodiment, the third information block is UE specific or UE dedicated.

In one embodiment, the third information block is Cell Common.

In one embodiment, the third information block is Cell specific.

In one embodiment, the third information block comprises physical-layer control information or physical-layer control parameters.

In one embodiment, the third information block comprises partial or all fields in a Downlink Control Information (DCI) format.

In one embodiment, the third information block is transmitted through a PDCCH.

In one embodiment, the third information block is the target sub-band specific or dedicated.

In one embodiment, the third information block is only used to configure the target sub-band.

In one embodiment, the third information block is dedicated to a sub-band other than the target sub-band that has a same ID or index as the target sub-band.

In one embodiment, the third information block is used to configure a sub-band other than the target sub-band that has a same ID or index as the target sub-band.

In one embodiment, a sub-band other than the target sub-band that has the same ID or index as the target sub-band shares all or partial configuration parameters in the third information block with the target sub-band.

In one embodiment, the third information block comprises partial or all fields in an IE “BWP Downlink”.

In one embodiment, the third information block comprises partial or all fields in an IE “BWP-Uplink”.

In one embodiment, the third information block comprises partial or all fields in one of an IE “BWP Downlink” or an IE “BWP-Uplink”.

In one embodiment, the expression in the claim that the third information block is used to determine configuration information of the target sub-band comprises the following meaning: the third information block is used by the first node in the present application to determine configuration information of the target sub-band.

In one embodiment, the expression in the claim that the third information block is used to determine configuration information of the target sub-band comprises the following meaning: the third information block is used to explicitly or implicitly indicate configuration information of the target sub-band.

In one embodiment, the expression in the claim that the third information block is used to determine configuration information of the target sub-band comprises the following meaning: one or multiple fields in the third information block is used to explicitly or implicitly indicate configuration information of the target sub-band.

In one embodiment, the first signaling comprises configuration of higher-layer information or higher-layer parameter.

In one embodiment, the first signaling comprises one or more Information Elements (IEs) comprised in a Radio Resource Control (RRC) layer signaling, or the first information block comprises one or more fields comprised in an RRC-layer signaling.

In one embodiment, the first signaling comprises configuration of physical-layer information or physical-layer parameters.

In one embodiment, the first signaling comprises one or multiple fields in a DCI format.

In one embodiment, the first signaling is transmitted through a PDCCH.

In one embodiment, the first signaling comprises a UL Grant in Random Access Response (RAR).

In one embodiment, the first signaling comprises a UL Grant in fallback Random Access Response (RAR).

In one embodiment, the first signaling comprises a Success RAR.

In one embodiment, the first signaling comprises an IE “ConfiguredGrantConfig”.

In one embodiment, the first signaling comprises an IE “SPS-Config”.

In one embodiment, the first signaling comprises partial or all fields comprised in a Master Information Block (MIB).

In one embodiment, the first signaling comprises partial or all fields comprised in a System Information Block (SIB).

In one embodiment, the first signaling is UE specific or UE dedicated.

In one embodiment, the first signaling is either cell common or cell specific.

In one embodiment, the first signaling is Group Common.

In one embodiment, the expression in the claim that the first signaling is used to determine the target time-frequency resource set comprises the following meaning: the first signaling is used by the first node in the present application to determine the target time-frequency resource set.

In one embodiment, the expression in the claim that the first signaling is used to determine the target time-frequency resource set comprises the following meaning: the first signaling is used to explicitly or implicitly indicate the target time-frequency resource set.

In one embodiment, the expression in the claim that the first signaling is used to determine the target time-frequency resource set comprises the following meaning: one or multiple fields or IEs comprised in the first signaling are used to determine the target time-frequency resource set.

In one embodiment, a type of the first signaling is one of the DCI formats for scheduling a PDSCH or scheduling a PUSCH.

In one embodiment, a type of the first signaling is one of DCI format 0_x or DCI format 1_y, x and y are both non-negative integers.

In one embodiment, a type of the first signaling is one of the DCI formats for scheduling downlink or scheduling uplink.

In one embodiment, a type of the first signaling is one of dedicated higher-layer parameters or physical layer parameters.

In one embodiment, a type of the first signaling is one of broadcast signaling or UE-specific signaling.

In one embodiment, a type of the first signaling is one of a signaling of random access process or a signaling of a non-random access process.

In one embodiment, a type of the first signaling is one of MIB, SIB, DCI format, and dedicated higher-layer parameters.

In one embodiment, a type of the first signaling is one of MIB, SIB1, DCI format, dedicated higher-layer parameters, RAR uplink grant, fallback RAR uplink grant, and success RAR.

In one embodiment, a type of the first signaling is one of an MIB, an SIB1, a DCI format indicating a PDSCH or a CSI-RS, a DCI format indicating a PUSCH, a PUCCH, a PRACH or an SRS, an RAR uplink grant, a fallback RAR uplink grant and a success RAR Embodiment 6

Figures 6, 7:
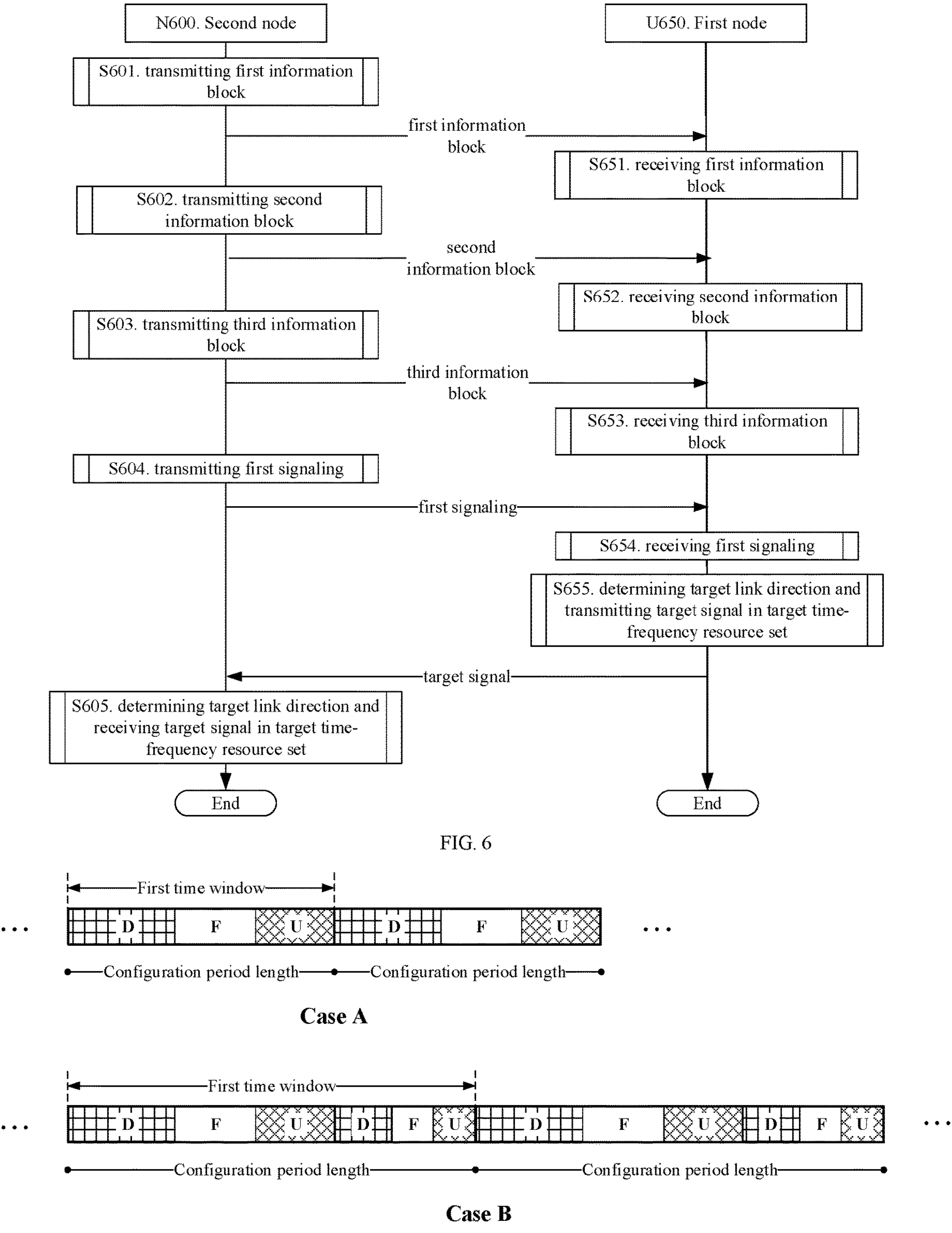
FIG. 6 illustrates a flowchart of radio signal transmission according to another embodiment of the present application.
FIG. 7 illustrates a schematic diagram of a first time window according to one embodiment of the present application.

Embodiment 6 illustrates a flowchart of radio signal transmission according to another embodiment of the present application, as shown in FIG. 6. In FIG. 6, a second node N600 is a maintenance base station of a serving cell of a first node U650. It is particularly underlined that the order illustrated in the embodiment does not put constraints over sequences of signal transmissions and implementations.

The second node N600 transmits a first information block in step S601, transmits a second information block in step S602, transmits a third information block in step S603, transmits a first signaling in step S604, determines the target link direction in step S605, and receives the target signal in a target time-frequency resource set;

The first node U650 receives a first information block in step S651, receives a second information block in step S652, receives a third information block in step S653, receives a first signaling in step S654, determines the target link direction in step S655, and receives a target signal in a target time-frequency resource set.

Embodiment 7

Embodiment 7 illustrates a schematic diagram of a first time window according to one embodiment of the present application, as shown in FIG. 7. In FIG. 7, in Case A and Case B, each reticle-filled rectangle represents at least one downlink (D) time-domain symbol, each crossline-filled rectangle represents at least one uplink (U) time-domain symbol, and each unfilled rectangle represents at least one flexible (F) time-domain symbol; in case A, only one distribution pattern of a time-domain symbol direction is comprised in a first time window; in case B, two distribution patterns of time domain symbol directions are comprised in a first time window.

In embodiment 7, the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols in the present application is equal to the first number of symbol(s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

In one embodiment, the expression in the present application that "the first information block is used to indicate a first number of symbol(s), a second number of symbol(s) and a configuration period length" comprises the following meaning: the first information block is used by the second node in the present application to indicate the first number of symbol(s), the second number of symbol(s), and the configuration period length.

In one embodiment, the expression in the present application that "the first information block is used to indicate a first number of symbol(s), a second number of symbol(s) and a configuration period length" comprises the following meaning: the first information block is used to explicitly or implicitly indicate the first number of symbol(s), the second number of symbol(s) and a configuration period length.

In one embodiment, the first number of symbol(s) can be equal to 0.

In one embodiment, the second number of symbol(s) can be equal to 0.

In one embodiment, the first number of symbol(s) is greater than 0.

In one embodiment, the second number of symbol(s) is greater than 0.

In one embodiment, at most one of the first number of symbol(s) and the second number of symbol(s) is equal to 0.

In one embodiment, the first number of symbol(s) and the second number of symbol(s) are equal.

In one embodiment, the first number of symbol(s) and the second number of symbol(s) are not equal.

In one embodiment, the first number of symbol(s) is equal to a number of descending symbol(s) provided by Pattern1, and the second number of symbol(s) is equal to the number of uplink symbols provided by Pattern1.

In one embodiment, the first number of symbol(s) is equal to a number of uplink symbol(s) provided by Pattern1, and the second number of symbol(s) is equal to a number of downlink symbol(s) provided by pattern 1.

In one embodiment, the first number of symbol(s) is equal to a number of downlink symbol(s) provided by Pattern 2, and the second number of symbol(s) is equal to a number of uplink symbols provided by pattern 2.

In one embodiment, the first number of symbol(s) is equal to a number of uplink symbol(s) provided by Pattern 2, and the second number of symbol(s) is equal to a number of downlink symbols provided by pattern 2.

In one embodiment, the first number of symbol(s) is equal to a sum of a number of downlink symbol(s) provided by Pattern1 and a number of downlink symbol(s) provided by Pattern 2, and the second number of symbol(s) is equal to a sum of a number of uplink symbol(s) provided by pattern 1 and the number of uplink symbol(s) provided by pattern 2.

In one embodiment, the first number of symbol(s) is equal to a sum of a number of uplink symbol(s) provided by Pattern1 and a number of uplink symbol(s) provided by Pattern2, and the second number of symbol(s) is equal to a sum of a number of downlink symbol(s) provided by pattern 1 and the number of downlink symbol(s) provided by pattern 2.

In one embodiment, the first number of symbol(s) is equal to a number of time-domain symbol(s) configured in a downlink direction by the first information block comprised in the first time window; the second number of symbol(s) is equal to a number of time-domain symbol(s) configured in an uplink direction by the first information block comprised in the first time window.

In one embodiment, the first number of symbol(s) is equal to a number of time-domain symbol(s) configured in an uplink direction by the first information block comprised in the first time window; the second number of symbol(s) is equal to a number of time-domain symbol(s) configured in a downlink direction by the first information block comprised in the first time window.

In one embodiment, the first number of symbol(s) is equal to a number of earliest time-domain symbol(s) configured in a downlink direction by the first information block comprised in the first time window; the second number of symbol(s) is equal to a number of latest time-domain symbol (s) configured in an uplink direction by the first information block comprised in the first time window.

In one embodiment, the first number of symbol(s) is equal to a number of latest time-domain symbol(s) configured in an uplink direction by the first information block comprised in the first time window; the second number of symbol(s) is equal to a number of earliest time-domain symbol(s) configured in a downlink direction by the first information block comprised in the first time window.

In one embodiment, the first number of symbol(s) is equal to a sum of a number of time-domain symbol(s) comprised in a slot configured by the first information block in downlink comprised in the first time window and a number of time-domain symbol(s) in a separate slot configured by the first information block in downlink; the second number of symbol(s) is equal to a sum of a number of time-domain symbol(s) comprised in a slot configured by the first information block in uplink comprised in the first time window and a number of time-domain symbol(s) in an individual slot configured by the first information block in uplink.

In one embodiment, the first number of symbol(s) is equal to a sum of a number of time-domain symbol(s) comprised in a slot configured by the first information block in uplink comprised in the first time window and a number of time-domain symbol(s) in a separate slot configured by the first information block in uplink; the second number of symbol (s) is equal to a sum of a number of time-domain symbol(s) comprised in a slot configured by the first information block in downlink and a number of time-domain symbol(s) configured by the first information block in a downlink individual slot.

In one embodiment, the configuration period length is measured by ms.

In one embodiment, the configuration period length is not greater than 20 ms.

In one embodiment, the configuration period length can be evenly divided by 20 ms.

In one embodiment, 20 ms is equal to a positive integer multiple of the configuration period length.

In one embodiment, the configuration period length is equal to one of P1 candidate period lengths, the P1 is a positive integer greater than 1, and any of the P1 candidate period lengths is a Valid period length.

In one embodiment, the first information block is used to indicate a reference subcarrier spacing; the configuration period length is equal to one of the P1 candidate period lengths, the P1 is a positive integer greater than 1, and any of the P1 candidate period lengths is a Valid period length; the reference subcarrier spacing is used to determine the P1 candidate period length.

In one embodiment, the first information block is used to indicate a reference subcarrier spacing, the first number of symbol(s) is equal to a number of time-domain symbol(s) corresponding to the reference subcarrier spacing, and the second number of symbol(s) is equal to a number of time-domain symbol(s) corresponding to the reference subcarrier spacing.

In one embodiment, the first information block is used to indicate a reference sub carrier spacing, and the first number of symbol(s) is equal to a number of time-domain symbol(s) comprised in the first time window that correspond to the reference subcarrier spacing configured in a downlink direction by the first information block; the second number of symbol(s) is equal to a number of time-domain symbol(s) comprised in the first time window that correspond to the reference subcarrier spacing configured in an uplink direction by the first information block.

In one embodiment, the first information block is used to indicate a reference subcarrier spacing, and the first number of symbol(s) is equal to a number of time-domain symbol(s) comprised in the first time window that correspond to the reference subcarrier spacing configured in an uplink direction by the first information block; the second number of symbol(s) is equal to a number of time-domain symbol(s) comprised in the first time window that correspond to the reference subcarrier spacing configured in a downlink direction by the first information block.

In one embodiment, the configuration period length is equal to a length of a slot configuration period in Pattern 1.

In one embodiment, the configuration period length is equal to a length of a slot configuration period in Pattern 2.

In one embodiment, the configuration period length is equal to a sum of a length of a slot configuration period in Pattern 1 and a length of a slot configuration period in Pattern 2.

In one embodiment, any of the X1 time-domain symbols belongs to the first time window.

In one embodiment, there exists one of the X1 time-domain symbol(s) belonging other than the first time window.

In one embodiment, the X1 time-domain symbols are distributed in multiple time windows, the first time window is one of the multiple time windows, the multiple time windows are continuous and periodically occurring time windows, and a length of an occurrence period of the multiple time windows is equal to the configuration period length.

In one embodiment, an initial time-domain symbol comprised in the first time window is an initial time-domain symbol of an even frame.

In one embodiment, the first time window is one of Ni time windows, where Ni is equal to a ratio between and the configuration period length, and Ni is a positive integer; a time length of any of the Ni time windows is equal to the configuration period length, the Ni time window occupies continuous time-domain symbols, and an initial time-domain symbol comprised in an earliest time window of the Ni time window is an initial time-domain symbol comprised in an even frame.

In one embodiment, when a number of time-domain symbol(s) belonging to the first time window among the X1 time-domain symbol(s) is equal to the first number of symbol(s), the first number of symbol(s) is greater than 0.

In one embodiment, when a number of time-domain symbol(s) belonging to the first time window among the X1 time-domain symbol(s) is equal to the second number of symbol(s), the second number of symbols is greater than 0.

Embodiment 8

Figure 8:
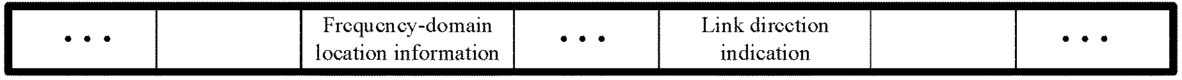
FIG. 8 illustrates a schematic diagram of a third information block according to one embodiment of the present application.

Embodiment 8 illustrates a schematic diagram of a third information block according to one embodiment of the present application, as shown in FIG. 8. In FIG. 8, the thick-line-framed rectangle represents a third information block, and each thin-line-framed rectangle represents a field or information element (IE) in a third information block.

In embodiment 8, the third information block in the present application is used to determine configuration information of the target sub-band in the present application, the configuration information of the target sub-band comprises at least one of location information of the target sub-band in frequency domain or a link direction indication of the target sub-band; the link direction indication of the target sub-band is used to determine whether the second information block in the present application can override a link direction of uplink time-domain symbols or downlink time-domain symbols configured by the first information block in the present application.

In one embodiment, location information of the target sub-band in frequency domain comprises an identifier or index of the target sub-band.

In one embodiment, location information of the target sub-band in frequency domain comprises an index of at least one PRB comprised in the target sub-band.

In one embodiment, location information of the target sub-band in frequency domain comprises an index of at least one subcarrier comprised in the target sub-band.

In one embodiment, location information of the target sub-band in frequency domain comprises center frequency of the target sub-band.

In one embodiment, location information of the target sub-band in frequency domain comprises frequency of a carrier to which the target sub-band belongs.

In one embodiment, location information of the target sub-band in frequency domain comprises a number of a band to which the target sub-band belongs.

In one embodiment, location information of the target sub-band in frequency domain comprises a frequency range (FR) to which the target sub-band belongs.

In one embodiment, location information of the target sub-band in frequency domain comprises an ID of a BWP to which the target sub-band belongs.

In one embodiment, location information of the target sub-band in frequency domain comprises an ID of at least one BWP comprised in the target sub-band.

In one embodiment, location information of the target sub-band in frequency domain comprises an ID of at least one BWP that overlaps with at least one subcarrier in the target sub-band.

In one embodiment, location information of the target sub-band in frequency domain comprises whether there exists at least one overlapping subcarrier between the target sub-band and a reference BWP. In one subsidiary embodiment of the above embodiment, the reference BWP is an initial BWP. In one subsidiary embodiment of the above embodiment, the reference BWP is a default BWP. In one subsidiary embodiment of the above embodiment, the reference BWP is an initial BWP configured by an MIB. In one subsidiary embodiment of the above embodiment, the reference BWP is an initial BWP configured by an SIB. In one subsidiary embodiment of the above embodiment, the reference BWP is predefined or explicitly or implicitly configured through signaling.

In one embodiment, location information of the target sub-band in frequency domain comprises whether subcarriers comprised in the target sub-band are all located near center frequency of a carrier to which they belong.

In one embodiment, location information of the target sub-band in frequency domain comprises whether there exists at least one of the subcarriers comprised in the target sub-band located near an edge of the carrier to which they belong.

In one embodiment, location information of the target sub-band in frequency domain comprises whether there exists at least one overlapping subcarrier between the target sub-band and a reference frequency band. In one subsidiary embodiment of the above embodiment, the reference frequency band is predefined. In one subsidiary embodiment of the above embodiment, the reference frequency band is explicitly or implicitly configured through signaling. In one subsidiary embodiment of the above embodiment, the reference frequency band is a frequency band in which a frequency interval between center frequency of a boundary subcarrier and a carrier to which the target sub-band belongs (or a channel bandwidth to which the target sub-band belongs, or a transmission bandwidth configuration to which the target sub-band belongs) is not greater than a first threshold, and the first threshold is predetermined, or the first threshold is implicitly or explicitly configured through signaling. In one subsidiary embodiment of the above embodiment, the reference frequency band is a frequency band in which a frequency interval between both highest frequency subcarrier and lowest frequency subcarrier comprised and center frequency of a carrier to which the target sub-band belongs (or a channel bandwidth to which the target sub-band belongs, or a transmission bandwidth configuration to which the target sub-band belongs) is not greater than a first threshold, and the first threshold is predetermined, or the first threshold is implicitly or explicitly configured through signaling. In one subsidiary embodiment of the above embodiment, when all subcarriers comprised in the target sub-band belong to the reference frequency band, the second information block can override a link direction of an uplink time-domain symbol or downlink time-domain symbol configured by the first information block; otherwise, the second information block can only override a link direction of a flexible time-domain symbol configured by the first information block. In one subsidiary embodiment of the above embodiment, when all subcarriers comprised in the target sub-band belong to the reference frequency band, the target link direction is the second link direction; otherwise, the target link direction is the first link direction.

In one embodiment, location information of the target sub-band in frequency domain comprises whether there exists a frequency interval between at least one subcarrier in the target sub-band and an edge of a carrier to which the target sub-band belongs (or a channel bandwidth to which the target sub-band belongs or a transmission bandwidth configuration to which the target sub-band belongs) is not greater than a second threshold, where the second threshold is predetermined, or where the second threshold is implicitly or explicitly configured by signaling. In one subsidiary embodiment of the above embodiment, when there exists a frequency-domain interval between at least one subcarrier in the target sub-band and an edge of a carrier to which the target sub-band belongs (or a channel bandwidth to which the target sub-band belongs, or a transmission bandwidth configuration to which the target sub-band belongs) is not greater than the second threshold, the second information block can only override a link direction of a flexible time-domain symbol configured by the first information block; otherwise, the second information block can override a link direction of an uplink time-domain symbol or a downlink time-domain symbol configured by the first information block. In one subsidiary embodiment of the above embodiment, when there exists a frequency-domain interval between at least one subcarrier in the target sub-band and an edge of a carrier to which the target sub-band belongs (or a channel bandwidth to which the target sub-band belongs, or a transmission bandwidth configuration to which the target sub-band belongs) is not greater than the second threshold, the target link direction is the first link direction; otherwise, the target link direction is the second link direction.

In one embodiment, a link direction indication of the target sub-band is equal to a value of a field comprised in the third information block.

In one embodiment, a link direction indication of the target sub-band is equal to a value of an IE comprised in the third information block.

In one embodiment, a link direction indication of the target sub-band is equal to a value of a Boolean parameter.

In one embodiment, a link direction indication of the target sub-band is equal to a value of a Flag parameter.

In one embodiment, a link direction indication of the target sub-band is a state of a switch.

In one embodiment, a link direction indication of the target sub-band is equal to a value of partial bits in a field comprised in the third information block.

In one embodiment, the expression in the claim that the configuration information of the target sub-band comprises at least one of location information of the target sub-band in frequency domain or a link direction indication of the target sub-band comprises the following meaning: configuration information of the target sub-band comprises location information of the target sub-band in frequency domain and a link direction indication of the target sub-band.

In one embodiment, the expression in the claim that the configuration information of the target sub-band comprises at least one of location information of the target sub-band in frequency domain or a link direction indication of the target sub-band comprises the following meaning: configuration information of the target sub-band comprises location information of the target sub-band in frequency domain, or only location information of the target sub-band in frequency domain in a link direction indication of the target sub-band.

In one embodiment, the expression in the claim that the configuration information of the target sub-band comprises at least one of location information of the target sub-band in frequency domain or a link direction indication of the target sub-band comprises the following meaning: configuration information of the target sub-band comprises location information of the target sub-band in frequency domain, or only a link direction indication of the target sub-band in a link direction indication of the target sub-band.

In one embodiment, configuration information of the target sub-band only comprises at least one of location information of the target sub-band in frequency domain or a link direction indication of the target sub-band.

In one embodiment, configuration information of the target sub-band also comprises configuration information other than location information of the target sub-band in frequency domain or a link direction indication of the target sub-band.

In one embodiment, the expression in the claim that a link direction indication of the target sub-band is used to determine whether the second information block can override a link direction of an uplink time-domain symbol or a downlink time-domain symbol configured by the first information block comprises the following meaning: a link direction indication of the target sub-band is used by the first node in the present application to determine whether the second information block can override a link direction of an uplink time-domain symbol or a downlink time-domain symbol configured by the first information block.

In one embodiment, the expression in the claim that a link direction indication of the target sub-band is used to determine whether the second information block can override a link direction of an uplink time-domain symbol or a downlink time-domain symbol configured by the first information block comprises the following meaning: a link direction indication of the target sub-band is used to explicitly or implicitly indicate whether the second information block can override a link direction of an uplink time-domain symbol or a downlink time-domain symbol configured by the first information block.

In one embodiment, the expression in the claim that a link direction indication of the target sub-band is used to determine whether the second information block can override a link direction of an uplink time-domain symbol or a downlink time-domain symbol configured by the first information block comprises the following meaning: a link direction indication of the target sub-band is used to explicitly or implicitly switch that the second information block can override a link direction of an uplink time-domain symbol or a downlink time-domain symbol configured by the first information block.

In one embodiment, the expression in the claim that a link direction indication of the target sub-band is used to determine whether the second information block can override a link direction of an uplink time-domain symbol or a downlink time-domain symbol configured by the first information block comprises the following meaning: a link direction indication of the target sub-band is used to explicitly or implicitly indicate whether the second information block can modify a link direction of an uplink time-domain symbol or a downlink time-domain symbol configured by the first information block.

In one embodiment, the expression in the claim that a link direction indication of the target sub-band is used to determine whether the second information block can override a link direction of an uplink time-domain symbol or a downlink time-domain symbol configured by the first information block comprises the following meaning: a link direction indication of the target sub-band is used to explicitly or implicitly indicate whether a link method of a time-domain symbol is determined by the second information block or first information block.

In one embodiment, when a link direction indication of the target sub-band determines that the second information block can override a link direction of an uplink time-domain symbol or a downlink time-domain symbol configured by the first information block, whether the second information block ultimately overrides a link direction of an uplink time-domain symbol or a downlink time-domain symbol configured by the first information block is indicated by other conditions or signalings; when a link direction indication of the target sub-band determines that the second information block cannot override a link direction of an uplink time-domain symbol or a downlink time-domain symbol configured by the first information block, the second information block ultimately does not override a link direction of an uplink time-domain symbol or a downlink time-domain symbol configured by the first information block.

In one embodiment, a link direction indication of the target sub-band does not ultimately determine a link direction in which the second information block overrides a link direction of an uplink time-domain symbol or a downlink time-domain symbol configured by the first information block.

In one embodiment, when a link direction indication of the target sub-band determines a link direction in which the second information block can override a link direction of an uplink time-domain symbol or a downlink time-domain symbol configured by the first information block, location information of the target sub-band in frequency domain is used to determine the target link direction between the first link direction and the second link direction; otherwise, the target link method is the first link direction.

In one embodiment, when a link direction indication of the target sub-band determines a link direction in which the second information block can override an uplink time-domain symbol or a downlink time-domain symbol configured by the first information block, location information of the target sub-band in frequency domain is used to determine whether the second information block overrides a link direction of an uplink time-domain symbol or a downlink time-domain symbol configured by the first information block; otherwise, the second information block only overrides a link direction of a flexible time-domain symbol configured by the first information block.

In one embodiment, configuration information of the target sub-band is used to determine whether the second information block overrides a link direction of an uplink time-domain symbol or a downlink time-domain symbol configured by the first information block.

Embodiment 9

Figure 9:
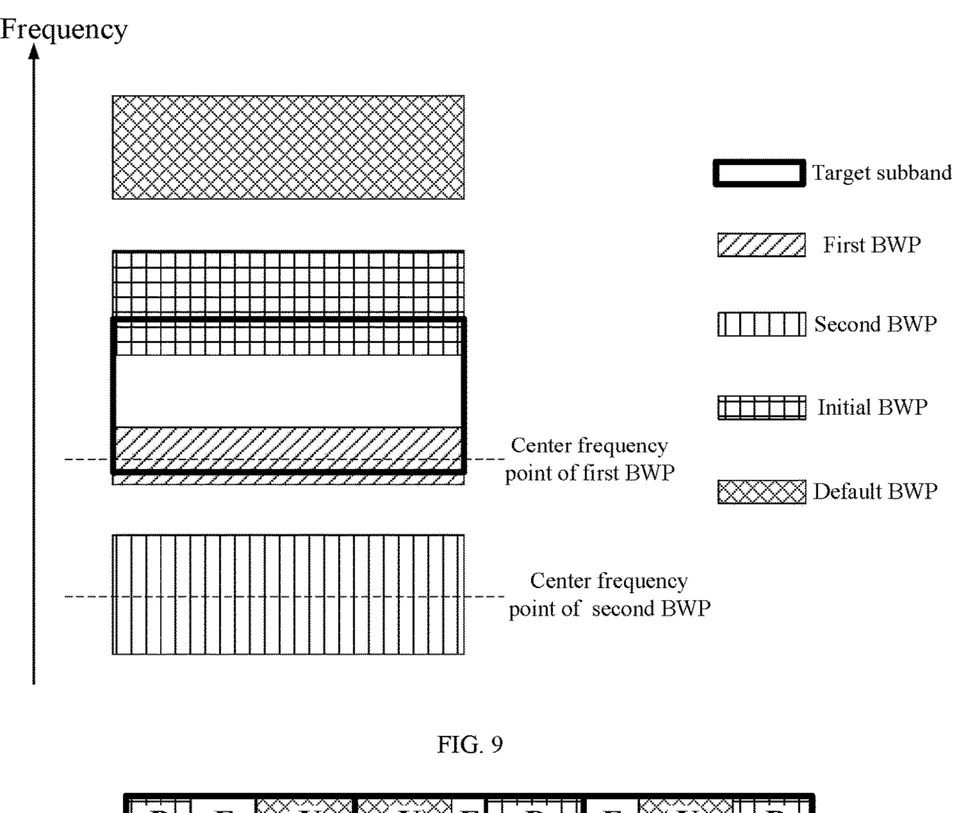
FIG. 9 illustrates a schematic diagram of a target sub-band according to one embodiment of the present application.

Embodiment 9 illustrates a schematic diagram of a target sub-band according to one embodiment of the present application, as shown in FIG. 9. In FIG. 9, the vertical axis represents frequency, the unfilled thick-line-framed rectangle represents a target sub-band, the slash-filled rectangle represents a first BWP, the vertical-filled rectangle represents a second BWP, the crossline-filled rectangle represents a default BWP, and the reticle-filled rectangle represents an initial BWP.

In embodiment 9, the target sub-band in frequency domain comprises a subcarrier belonging to a first BWP, an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction in the present application from the first link direction in the present application or the second link direction in the present application.

In one embodiment, the first BWP is an active BWP.

In one embodiment, any subcarrier comprised in the target sub-band belongs to the first BWP.

In one embodiment, the target sub-band comprises that a subcarrier belongs other than the first BWP.

In one embodiment, the target sub-band and the first BWP comprise completely same frequency-domain resources or subcarriers.

In one embodiment, any subcarrier comprised in the first BWP belongs to the target sub-band.

In one embodiment, the target sub-band is the first BWP.

In one embodiment, an index of the first BWP is a non-negative integer.

In one embodiment, an index of the first BWP is an index of the first BWP in a BWP set or a list to which it belongs.

In one embodiment, an index of the first BWP is an ID of the first BWP.

In one embodiment, an index of the second BWP is a non-negative integer.

In one embodiment, an index of the second BWP is an index of the second BWP in a BWP set or a list to which it belongs.

In one embodiment, an index of the second BWP is an ID of the second BWP.

In one embodiment, "a link direction corresponding to the first BWP" refers to: the first BWP is either a DL BWP or a UL BWP.

In one embodiment, "a link direction corresponding to the first BWP" refers to a link direction of a channel or a signal for which the first BWP is used for transmission.

In one embodiment, "a link direction corresponding to the first BWP" refers to a link direction configured for the first BWP.

In one embodiment, "a link direction corresponding to the first BWP" refers to a link direction of a BWP list or set to which the first BWP belongs.

In one embodiment, "a link direction corresponding to the first BWP" refers to a link direction associated with the first BWP.

In one embodiment, "a link direction corresponding to the second BWP" refers to: the second BWP is either a DL BWP or a UL BWP.

In one embodiment, "a link direction corresponding to the second BWP" refers to a link direction of a channel or a signal for which the second BWP is used for transmission.

In one embodiment, "a link direction corresponding to the second BWP" refers to a link direction configured for the second BWP.

In one embodiment, "a link direction corresponding to the second BWP" refers to a link direction of a BWP list or a set to which the second BWP belongs.

In one embodiment, "a link direction corresponding to the second BWP" refers to a link direction associated with the second BWP.

In one embodiment, a link direction corresponding to the first BWP is an uplink (UL), and a link direction corresponding to the second BWP is a downlink (DL).

In one embodiment, a link direction corresponding to the second BWP is an uplink (UL), and a link direction corresponding to the first BWP is a downlink (DL).

In one embodiment, the expression in the claim that at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction comprises the following meaning: at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used by the first node in the present application to determine the target link direction between the first link direction and the second link direction.

In one embodiment, the expression in the claim that at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction comprises the following meaning: whether there are overlapping frequency-domain resources between the target sub-band and an initial BWP, whether there are overlapping frequency-domain resources between the target sub-band and a default BWP, and whether center frequency of the first BWP and center frequency of the second BWP are equal are used to determine the target link direction between the first link direction and the second link direction.

In one embodiment, the expression in the claim that at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction comprises the following meaning: only one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

In one embodiment, the expression in the claim that at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction comprises the following meaning: only two of whether there are overlapping frequency-domain resources between the target sub-band and an initial BWP, whether there are overlapping frequency-domain resources between the target sub-band and a default BWP, and whether center frequency of the first BWP and center frequency of the second BWP are equal are used to determine the target link direction between the first link direction and the second link direction.

In one embodiment, the expression in the claim that whether there are overlapping frequency-domain resources between the target sub-band and an initial BWP comprises the following meaning: whether the target sub-band and an initial BWP are not orthogonal.

In one embodiment, the expression in the claim that whether there are overlapping frequency-domain resources between the target sub-band and an initial BWP comprises the following meaning: whether there have overlapping subcarriers or overlapping PRBs between the target sub-band and an initial BWP.

In one embodiment, the expression in the claim that whether there are overlapping frequency-domain resources between the target sub-band and an initial BWP comprises the following meaning: whether there are overlapping frequency-domain resources between the first BWP and an initial BWP.

In one embodiment, the expression in the claim that whether there have overlapping frequency-domain resources between the target sub-band and a default BWP comprises the following meaning: whether the target sub-band and a default BWP are not orthogonal.

In one embodiment, the expression in the claim that whether there have overlapping frequency-domain resources between the target sub-band and a default BWP comprises the following meaning: whether there are overlapping subcarriers or overlapping PRBs between the target sub-band and a default BWP.

In one embodiment, the expression in the claim that whether there have overlapping frequency-domain resources between the target sub-band and a default BWP comprises the following meaning: whether there are overlapping frequency-domain resources between the first BWP and a default BWP.

In one embodiment, the initial BWP is Control Resource Set (CORESET) #0.

In one embodiment, the initial BWP is a BWP other than Control Resource Set (CORESET) #0.

In one embodiment, the initial BWP is MIB configured.

In one embodiment, the initial BWP is SIB configured.

In one embodiment, the initial BWP is UE specific or dedicated.

In one embodiment, the initial BWP is Cell Specific or Cell Common.

In one embodiment, the Default BWP (Default BWP) is the initial BWP.

In one embodiment, the default BWP is a BWP other than the initial BWP.

In one embodiment, the default BWP is configured, or the default BWP is the initial BWP.

In one embodiment, the expression in the claim that at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction comprises the following meaning: when a link direction indication of the target sub-band in the present application determines that the second information block can override a link direction of an uplink time-domain symbol or a downlink time-domain symbol configured in the first information block, at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction; otherwise, the target link direction is the first link direction.

In one embodiment, when one of the target sub-band and the initial BWP having overlapping frequency-domain resources, the target sub-band and the default BWP having overlapping frequency-domain resources, and center frequency of the first BWP and center frequency of the second BWP being equal is satisfied, the target link direction is the first link direction; otherwise, the target link direction is the second link direction.

In one embodiment, when there are overlapping frequency-domain resources between the target sub-band and an initial BWP, the target link direction is the first link direction.

In one embodiment, when there are overlapping frequency-domain resources between the target sub-band and a default BWP, the target link direction is the first link direction.

In one embodiment, when center frequency of the first BWP and center frequency of the second BWP are equal, the target link direction is the first link direction.

In one embodiment, when there is no overlapping frequency domain resource between the target sub-band and an initial BWP, and when a link direction indication of the target sub-band in the present application determines that the second information block can override a link direction of an uplink time-domain symbol or a downlink time-domain symbol configured by the first information block, the target link direction is the second link direction.

In one embodiment, when there is no overlapping frequency domain resource between the target sub-band and a default BWP, and when a link direction indication of the target sub-band in the present application determines that the second information block can override a link direction of an uplink time-domain symbol or a downlink time-domain symbol configured by the first information block, the target link direction is the second link direction.

In one embodiment, when center frequency of the first BWP and center frequency of a second BWP are not equal, and when a link direction indication of the target sub-band in the present application determines that the second information block can override a link direction of an uplink time-domain symbol or a downlink time-domain symbol configured by the first information block, the target link direction is the second link direction.

Embodiment 10

Figure 10:
FIG. 10 illustrates a schematic diagram of a first slot set according to one embodiment of the present application.

Embodiment 10 illustrates a schematic diagram of a first slot set according to one embodiment of the present application, as shown in FIG. 10. In FIG. 10, each thick-line-framed rectangle represents a slot in a first slot set, each reticle-filled rectangle represents at least one downlink (D) time-domain symbol, each crossline-filled rectangle represents at least one uplink (U) time-domain symbol, and each unfilled rectangle represents at least one flexible (F) time-domain symbol.

In embodiment 10, one of the X2 time-domain symbols in the present application belongs to a slot in a first slot set, and the first slot set comprises at least one slot; the second information block in the present application is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

In one embodiment, any of the X2 time-domain symbols belongs to a slot in the first slot set.

In one embodiment, there exists one of the X2 time-domain symbols belonging to a slot other than the first slot set.

In one embodiment, when the first slot set comprises multiple slots, the first time slot set comprises slots continuous in time domain.

In one embodiment, when the first slot set comprises multiple slots, the first time slot set comprises slots discrete in time domain.

In one embodiment, the first slot set only comprises one slot.

In one embodiment, the first slot set comprises multiple slots.

In one embodiment, a slot format of a slot comprised in the first slot set comprises a number of uplink time-domain symbols and a number of downlink time-domain symbols.

In one embodiment, a slot format of a slot comprised in the first slot set comprises a distribution pattern of uplink and downlink time-domain symbols.

In one embodiment, a slot format of a slot comprised in the first slot set comprises a number and a distribution pattern of uplink and downlink time-domain symbols.

In one embodiment, the expression in the claim that the second information block is used to determine a slot format of each slot comprised in the first slot set comprises the following meaning: the second information block is used by the first node in the present application to determine a slot format for each slot comprised in the first slot set.

In one embodiment, the expression in the claim that the second information block is used to determine a slot format of each slot comprised in the first slot set comprises the following meaning: the second information block is used to explicitly or implicitly indicate a slot format for each slot comprised in the first slot set.

In one embodiment, any of the M1 candidate slot formats comprises a distribution pattern of uplink and downlink time-domain symbols in a slot.

In one embodiment, any of the M1 candidate slot formats comprises a number of uplink and downlink time-domain symbols in a slot.

In one embodiment, any of the M1 candidate slot formats comprises a number and distribution pattern of uplink and downlink time-domain symbols in a slot.

In one embodiment, any of the M1 candidate slot formats comprises a distribution pattern of uplink and downlink time-domain symbols and flexible time-domain symbols in a slot.

In one embodiment, the M1 candidate slot formats comprises one candidate slot format comprising full-downlink time-domain symbols.

In one embodiment, the M1 candidate slot formats comprises one candidate slot format comprising full-uplink time-domain symbols.

In one embodiment, the M1 candidate slot formats comprises one candidate slot format comprising partial time-domain symbols within a slot being downlink time-domain symbols.

In one embodiment, the M1 candidate slot formats comprises one candidate slot format comprising earliest positive integer number of flexible symbol(s), then positive integer number of uplink symbol(s), and at last positive integer number of downlink symbol(s).

In one embodiment, the M1 candidate slot formats comprises one candidate slot format comprising any flexible symbol earlier than any uplink symbol or any downlink symbol, and any uplink symbol being earlier than any downlink symbol.

In one embodiment, the M1 candidate slot formats comprises one candidate slot format comprising partial time-domain symbols within a slot being uplink time-domain symbols.

In one embodiment, the M1 candidate slot formats comprises one candidate slot format comprising all time-domain symbols within a slot being flexible time-domain symbols.

In one embodiment, any two of the M1 candidate slot formats being different.

In one embodiment, at least one of a number of downlink time-domain symbol(s) within a slot, a number of uplink time-domain symbol(s) within a slot or a sequential order between downlink time-domain symbol(s) and uplink time-domain symbol(s) within a slot comprised in any two of the M1 candidate slot formats is different.

In one embodiment, at least one of a number of downlink time-domain symbol(s) within a slot, a number of uplink time-domain symbol(s) within a slot or a distribution of uplink and downlink time-domain symbol(s) within a slot comprised in any two of the M1 candidate slot formats is different.

In one embodiment, the M1 candidate slot formats are pre-defined.

In one embodiment, the M1 candidate slot formats are explicitly or implicitly configured.

In one embodiment, a link direction indication of the target sub-band in the present application is used to determine the M1 candidate slot formats.

In one embodiment, a capability of the first node in the present application to support flexible duplex is used to determine the M1 candidate slot formats.

In one embodiment, a capability of the first node in the present application is used to determine the M1 candidate slot formats.

In one embodiment, a capability of the first node in the present application and an explicit or implicit configuration are used to determine the M1 candidate slot formats.

In one embodiment, whether the first node in the present application is configured with the second information block can override the first information block to be used to determine the M1 candidate slot formats.

In one embodiment, there only exists uplink time-domain symbols comprised being earlier than downlink time-domain symbols in only one of the M1 candidate slot formats.

In one embodiment, there exists uplink time-domain symbols comprised in multiple candidate slot formats being earlier than downlink time-domain symbols in the M1 candidate slot formats.

In one embodiment, there exists any uplink time-domain symbol comprised in at least one candidate slot format being earlier than any downlink time-domain symbol in the M1 candidate slot formats.

In one embodiment, there exists one uplink time-domain symbol comprised in at least one candidate slot format being earlier than a downlink time-domain symbol in the M1 candidate slot formats.

In one embodiment, there exists an uplink time-domain symbol comprised being distributed before a downlink time-domain symbol in at least one of the M1 candidate slot formats.

In one embodiment, there exists an uplink time-domain symbol comprised in at least one of the M1 candidate slot formats being a positive integer number of symbol(s) start from slot, and the comprised downlink time-domain symbol is a positive integer number of symbol(s) end in slot.

In one embodiment, there exists one uplink time-domain symbol comprised in at least one candidate slot format being earlier than a downlink time-domain symbol and an uplink time-domain symbol being later than a downlink time-domain symbol in the M1 candidate slot formats.

Embodiment 11

Figure 11:
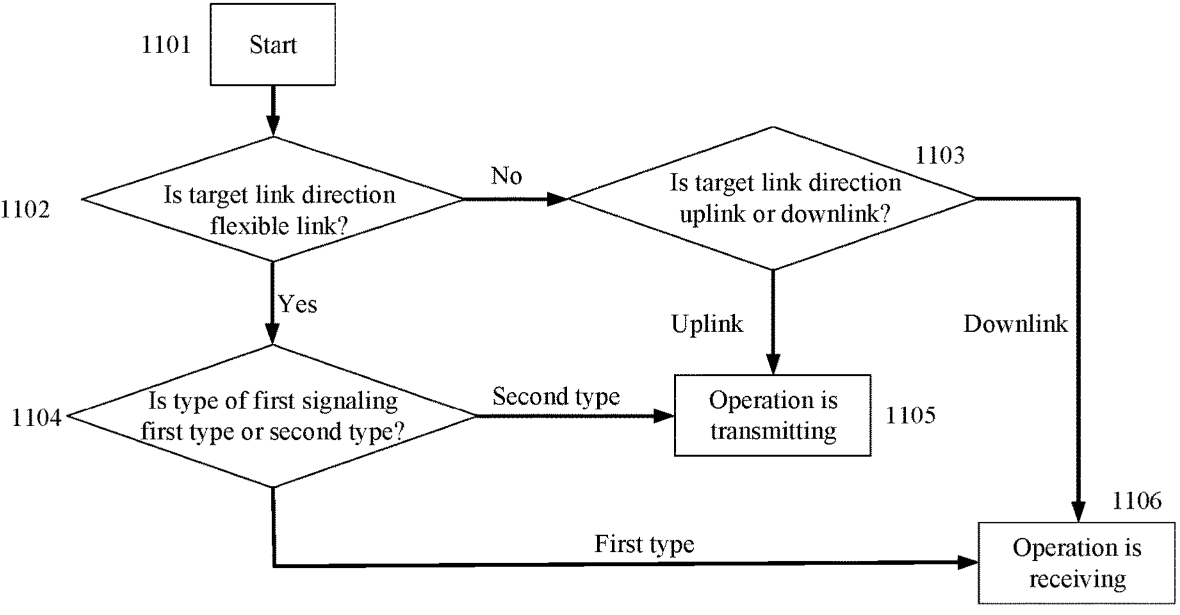
FIG. 11 illustrates a schematic diagram of a relation between a type of a first signaling and an operation according to one embodiment of the present application.

Embodiment 11 illustrates a schematic diagram of a relation between a type and an operation of a first signaling according to one embodiment of the present application, as shown in FIG. 11. In FIG. 11, starting from 1101, judge whether a target link direction is a flexible link in 1102; judge whether a target link direction is an uplink or a downlink in 1103; judge whether a type of the first signaling is a type I or a type II in 1104; the operation is transmitting in 1105; and the operation is receiving in 1106.

In Embodiment 11, the first signaling in the present application is used to determine the target time-frequency resource set in the present application, and a type of the first signaling and the target link direction in the present application are used to determine whether the operation in the present application is receiving or transmitting.

In one embodiment, the expression in the claim that a type of the first signaling and the target link direction are used to determine whether the operation is receiving or transmitting comprises the following meaning: a type of the first signaling and the target link direction are used by the first node in the present application to determine whether the operation is receiving or transmitting.

In one embodiment, the expression in the claim that a type of the first signaling and the target link direction are used to determine whether the operation is receiving or transmitting comprises the following meaning: a type of the first signaling and the target link direction are used to determine whether the target signal is an uplink signal or a downlink signal.

In one embodiment, the expression in the claim that a type of the first signaling and the target link direction are used to determine whether the operation is receiving or transmitting comprises the following meaning: a type of the first signaling and the target link direction are used by the first node in the present application to determine whether the operation is receiving or transmitting; when the operation is receiving, the target signal is a downlink signal; when the operation is transmitting, the target signal is an uplink signal.

In one embodiment, the expression in the claim that a type of the first signaling and the target link direction are used to determine whether the operation is receiving or transmitting comprises the following meaning: a type of the first signaling and the target link direction are used to determine whether the operation is receiving or transmitting according to a pre-defined conditional relation.

In one embodiment, the expression in the claim that a type of the first signaling and the target link direction are used to determine whether the operation is receiving or transmitting comprises the following meaning: when the target link direction is a flexible link and a type of the first signaling is used to determine whether the operation is receiving or transmitting; when the target link direction is uplink, the operation is transmitting; when the target link direction is downlink, the operation is receiving.

In one embodiment, the expression in the claim that a type of the first signaling and the target link direction are used to determine whether the operation is receiving or transmitting comprises the following meaning: a type of the first signaling is one of a first type or a second type, and the first type and the second type are not the same; when the target link direction is a flexible link and when a type of the first signaling is the first type, the operation is receiving; when the target link direction is a flexible link and when a type of the first signaling is the second type, the operation is transmitting; when the target link direction is uplink, the operation is transmitting; when the target link direction is downlink, the operation is receiving. In one subsidiary embodiment of the above embodiment, the first type is a DCI format scheduling a PDSCH, and the second type is the DCI format scheduling a PUSCH. In one subsidiary embodiment of the above embodiment, the first type comprises a DCI format indicating a PDSCH or a CSI-RS, and the second type comprises a DCI format indicating a PUSCH, a PUCCH, a PRACH or an SRS, an RAR uplink grant, a fallback RAR uplink grant, or a success RAR. In one subsidiary embodiment of the above embodiment, the first type comprises an MIB, an SIB1, a DCI format indicating a PDSCH or a CSI-RS, and the second type comprises a DCI format indicating a PUSCH, a PUCCH, a PRACH or an SRS, an RAR uplink grant, a fallback RAR uplink grant, or a success RAR. In one subsidiary embodiment of the above embodiment, the first type and the second type are pre-defined, or the first type and the second type are explicitly or implicitly configured.

In one embodiment, the expression in the claim that a type of the first signaling and the target link direction are used to determine whether the operation is receiving or transmitting comprises the following meaning: when the target link direction is a flexible link or an uplink, a type of the first signaling is used to determine whether the operation is receiving or transmitting; when the target link direction is downlink, the operation is receiving.

In one embodiment, the expression in the claim that a type of the first signaling and the target link direction are used to determine whether the operation is receiving or transmitting comprises the following meaning: when the target link direction is a flexible link or a downlink, a type of the first signaling is used to determine whether the operation is receiving or transmitting; when the target link direction is uplink, the operation is transmitting.

In one embodiment, the expression in the claim that a type of the first signaling and the target link direction are used to determine whether the operation is receiving or transmitting comprises the following meaning: a type of the first signaling is one of a first type or a second type, and the first type and the second type are not the same; when the target link direction is a flexible link or an uplink and when the type of the first signaling is the first type, the operation is receiving; when the target link direction is a flexible link or an uplink and when the type of the first signaling is the second type, the operation is transmitting; when the target link direction is downlink, the operation is receiving. In one subsidiary embodiment of the above embodiment, the first type is a DCI format scheduling a PDSCH, and the second type is a DCI format scheduling a PUSCH. In one subsidiary embodiment of the above embodiment, the first type comprises a DCI format indicating a PDSCH or a CSI-RS, and the second type comprises a DCI format indicating a PUSCH, a PUCCH, a PRACH or an SRS, an RAR uplink grant, a fallback RAR uplink grant, or a success RAR. In one subsidiary embodiment of the above embodiment, the first type comprises an MIB, an SIB1, a DCI format indicating a PDSCH or a CSI-RS, and the second type comprises a DCI format indicating a PUSCH, a PUCCH, a PRACH or an SRS, an RAR uplink grant, a fallback RAR uplink grant, or a success RAR. In one subsidiary embodiment of the above embodiment, the first type and the second type are pre-defined, or the first type and the second type are explicitly or implicitly configured.

Embodiment 12

Figure 12:
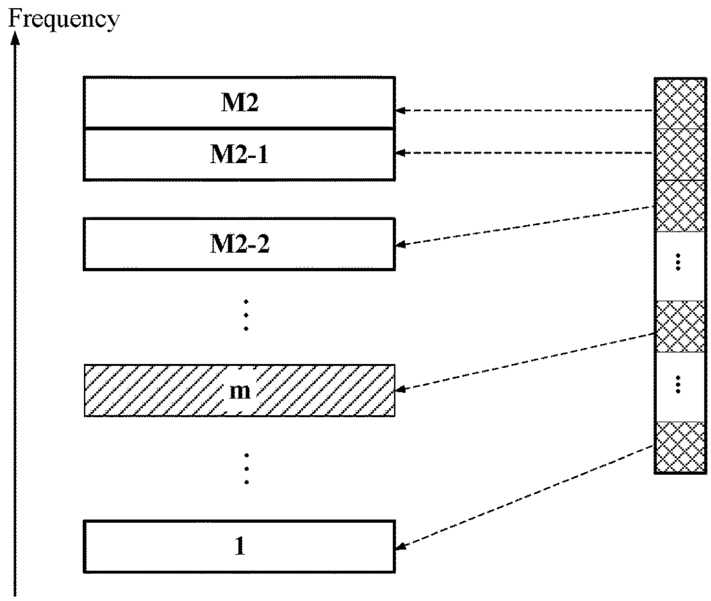
FIG. 12 illustrates a schematic diagram of a relation between M2 candidate sub-bands and M2 sub-information blocks according to one embodiment of the present application.

Embodiment 12 illustrates a schematic diagram of a relation between M2 candidate sub-bands and M2 sub-information blocks according to one embodiment of the present application, as shown in FIG. 12. In FIG. 12, the vertical axis represents frequency, each internally labeled rectangle represents one of M2 candidate sub-bands, the slash-filled rectangle represents a target sub-band, the cross-line-filled rectangle represents one of the M2 sub-information blocks, and the dashed line with arrow represents a determination relation.

In embodiment 12, the second information block in the present application comprises M2 sub-information blocks, the M2 sub-information blocks are respectively used to determine slot formats respectively corresponding to M2 candidate sub-bands, the target sub-band in the present application is one of the M2 candidate sub-bands, and M2 is a positive integer greater than 1.

In one embodiment, the M2 is equal to 2.

In one embodiment, the M2 is equal to 4.

In one embodiment, any of the M2 sub-information blocks is an IE.

In one embodiment, the M2 sub-information blocks belong to a same sub-band configuration list.

In one embodiment, the M2 sub-information blocks belong to a same BWP AddModList.

In one embodiment, any of the M2 sub-information blocks is IE "BWP-Flexible".

In one embodiment, any of the M2 sub-information blocks is IE "BWP-Duplex".

In one embodiment, any two of the M2 sub-information blocks comprise a same field structure.

In one embodiment, there exist two of the M2 sub-information blocks comprising different field structures.

In one embodiment, any of the M2 sub-information blocks is configured per sub-band.

In one embodiment, any of the M2 candidate sub-bands is BWP (Bandwidth Part).

In one embodiment, any of the M2 candidate sub-bands is a downlink BWP or an uplink BWP.

In one embodiment, any of the M2 candidate sub-bands comprises at least one BWP.

In one embodiment, any of the M2 candidate sub-bands comprises at least one subcarrier.

In one embodiment, any of the M2 candidate sub-bands comprises at least one PRB.

In one embodiment, all subcarriers comprised in any of the M2 candidate sub-bands belong to a same BWP.

In one embodiment, a subcarrier spacing of any two subcarriers comprised in any of M2 candidate sub-bands is equal.

In one embodiment, any of the M2 candidate sub-bands comprises continuous frequency-domain resources.

In one embodiment, any of the M2 candidate sub-bands comprises a guard subcarrier or a PRB.

In one embodiment, any of the M2 candidate sub-bands comprises a subcarrier or PRB not available for transmission or allocation.

In one embodiment, any of the M2 candidate sub-bands is a sub-band supporting flexible duplex.

In one embodiment, any of the M2 candidate sub-bands is a BWP supporting flexible duplex.

In one embodiment, any of the M2 candidate sub-bands is a BWP simultaneously supporting uplink and downlink.

In one embodiment, any of the M2 candidate sub-bands is a BWP of flexible link direction.

In one embodiment, any two of the M2 candidate sub-bands belong to a same serving cell.

In one embodiment, any two of the M2 candidate sub-bands belong to a same subcarrier.

In one embodiment, any two of the M2 candidate sub-bands are orthogonal.

In one embodiment, there exist two of the M2 candidate sub-bands being non-orthogonal.

In one embodiment, there exists an overlapping subcarrier between two of the M2 candidate sub-bands.

In one embodiment, a slot format corresponding to any of the M2 candidate sub-bands is a slot format associated with a candidate sub-band.

In one embodiment, a slot format corresponding to any of the M2 candidate sub-bands is a slot format applicable within a candidate sub-band.

In one embodiment, a slot format corresponding to any of the M2 candidate sub-bands is a slot format satisfied by a transmission occupying a subcarrier within a candidate sub-band in frequency domain.

In one embodiment, there exist slot formats respectively corresponding to two of the M2 candidate sub-bands being different.

In one embodiment, slot formats respectively corresponding to any two of the M2 candidate sub-bands being independently configured.

In one embodiment, the M2 sub-information blocks are respectively used to determine frequency-domain resources respectively occupied by the M2 candidate sub-bands.

In one embodiment, the M2 sub-information blocks are respectively used to indexes or IDs of the M2 candidate sub-bands.

In one embodiment, the expression in the claim that the M2 sub-information blocks are respectively used to determine slot formats respectively corresponding to M2 candidate sub-bands comprises the following meaning: the M2 sub-information blocks are respectively used by the first node in the present application to determine slot formats respectively corresponding to the M2 candidate sub-bands.

In one embodiment, the expression in the claim that the M2 sub-information blocks are respectively used to determine slot formats respectively corresponding to M2 candidate sub-bands comprises the following meaning: the M2 sub-information blocks are respectively used to explicitly or implicitly indicate slot formats respectively corresponding to the M2 candidate sub-bands.

In one embodiment, the expression in the claim that the M2 sub-information blocks are respectively used to determine slot formats respectively corresponding to M2 candidate sub-bands comprises the following meaning: the M2 sub-information blocks respectively and independently configure slot formats respectively corresponding to the M2 candidate sub-bands.

In one embodiment, the expression in the claim that the M2 sub-information blocks are respectively used to determine slot formats respectively corresponding to M2 candidate sub-bands comprises the following meaning: one or multiple fields in the M2 sub-information blocks are respectively used to determine slot formats respectively corresponding to the M2 candidate sub-bands.

In one embodiment, the expression in the claim that the M2 sub-information blocks are respectively used to determine slot formats respectively corresponding to M2 candidate sub-bands comprises the following meaning: the M2 sub-information blocks are respectively used to explicitly or implicitly indicate indexes of slot formats respectively corresponding to the M2 candidate sub-bands.

In one embodiment, the expression in the claim that the M2 sub-information blocks are respectively used to determine slot formats respectively corresponding to M2 candidate sub-bands comprises the following meaning: the M2 sub-information blocks are respectively used to explicitly or implicitly indicate slot formats respectively corresponding to the M2 candidate sub-bands from the M1 candidate slot formats in the present application.

In one embodiment, a slot format corresponding to any of the M2 candidate sub-bands is one of the M1 candidate slot formats in the present application.

In one embodiment, a slot format corresponding to any of M2 candidate sub-bands comprises a distribution pattern of uplink and downlink time-domain symbols within a slot.

In one embodiment, a slot format corresponding to any of M2 candidate sub-bands comprises a number of uplink and downlink time-domain symbols within a slot.

In one embodiment, a slot format corresponding to any of M2 candidate sub-bands comprises a number of and a distribution pattern of uplink and downlink time-domain symbols within a slot.

In one embodiment, a slot format corresponding to any of M2 candidate sub-bands comprises a distribution pattern of uplink and downlink time-domain symbols and flexible time-domain symbols within a slot.

Embodiment 13

Figure 13:
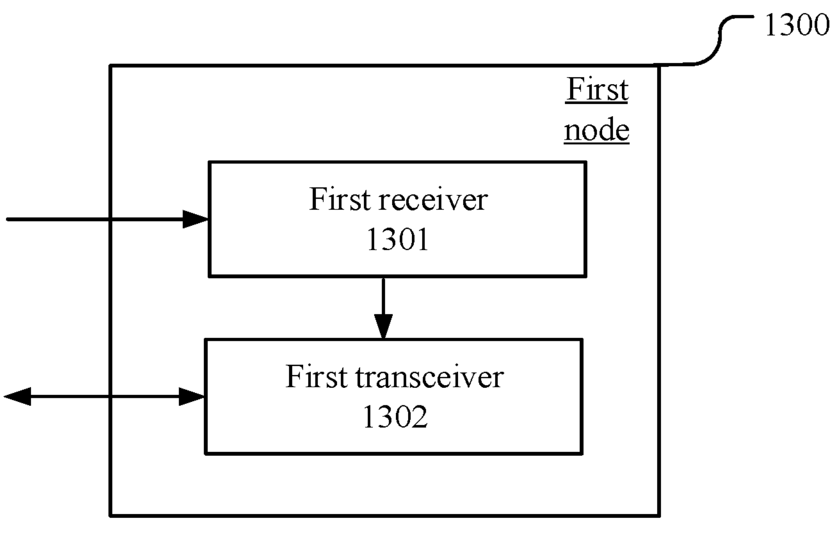
FIG. 13 illustrates a structure block diagram of a processor in a first node according to one embodiment of the present application.

Embodiment 13 illustrates the structure diagram of a processor in a first node, as shown in FIG. 13. In FIG. 13, a processor 1300 of a first node comprises a first receiver 1301 and a first transceiver 1302. The first receiver 1301 comprises the transmitter/receiver 456 (including the antenna 460), the receiving processor 452 and the controller/processor 490 in FIG. 4 of the present application; the first transceiver 1302 comprises the transmitter/receiver 456 (including the antenna 460), the receiver processor 452, the transmitting processor 455 and the controller/processor 490 in FIG. 4 of the present application.

In embodiment 13, the first receiver 1301 receives a first information block and receives a second information block, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; the first transceiver 1302 determines a target link direction and operates a target signal in a target time-frequency resource set, the target time-frequency resource set comprises at least one time-domain symbol in time domain, a link direction of any time-domain symbol comprised in the target time-frequency resource set in time domain is the target link direction, and the operation is receiving or the operation is transmitting; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

In one embodiment, the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol (s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

In one embodiment, the first receiver 1301 receives a third information block; herein, the third information block is used to determine configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

In one embodiment, the target sub-band in frequency domain comprises a subcarrier belonging to a first BWP, an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

In one embodiment, one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

In one embodiment, the first receiver 1301 receives a first signaling; herein, the first signaling is used to determine the target time-frequency resource set, and a type of the first signaling and the target link direction are used to determine whether the operation is receiving or transmitting.

In one embodiment, the second information block comprises M2 sub-information blocks, the M2 sub-information blocks are respectively used to determine slot formats respectively corresponding to M2 candidate sub-bands, the target sub-band is one of the M2 candidate sub-bands, M2 being a positive integer greater than 1.

Embodiment 14

Figure 14:
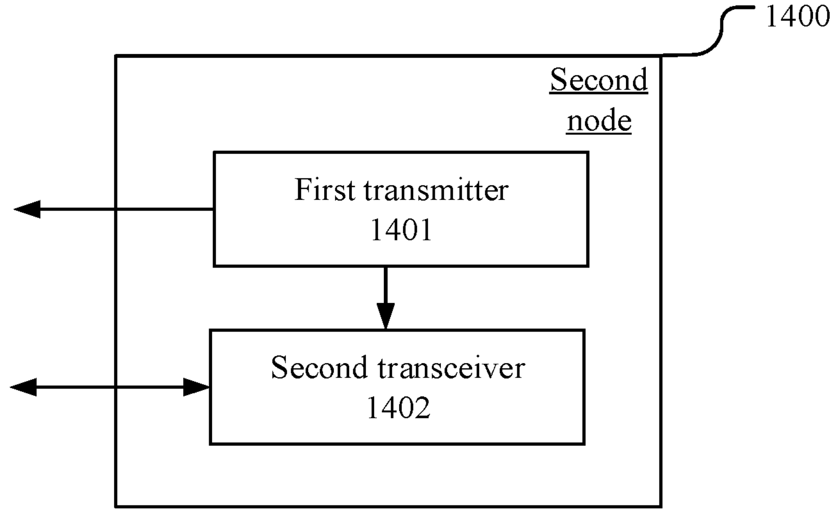
FIG. 14 illustrates a structure block diagram of a processor in second node according to one embodiment of the present application.

Embodiment 14 illustrates a structure block diagram of a processor in a second node according to one embodiment of the present application, as shown in FIG. 14. In FIG. 14, a processor 1400 of the second node comprises a first transmitter 1401 and a second transceiver 1402. The first transmitter 1401 comprises the transmitter/receiver 416 (including the antenna 460), the transmitting processor 415 and the controller/processor 440 in FIG. 4 of the present application; the second transceiver 1402 comprises the transmitter/receiver 416 (including the antenna 460), the receiving processor 412, the transmitting processor 415 and the controller/processor 440 in FIG. 4 of the present application.

In embodiment 14, the first transmitter 1401 transmits a first information block and a second information block, the first information block is used to determine X1 time-domain symbols corresponding to a first link direction, and the second information block is used to determine X2 time-domain symbols corresponding to a second link direction, X1 being a positive integer greater than 1, X2 being a positive integer greater than 1, and the first link direction is different from the second link direction; the second transceiver 1402 determines a target link direction and executes a target signal in a target time-frequency resource set, the target time-frequency resource set comprises at least one time-domain symbol in time domain, a link direction of any time-domain symbol comprised in the target time-frequency resource set in time domain is the target link direction, and the execution is transmitting or the execution is receiving; herein, a time-domain symbol comprised in the target time-frequency resource set in time domain is one of the X1 time-domain symbols, and a time-domain symbol comprised in the target time-frequency resource set in time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

In one embodiment, the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

In one embodiment, the first transmitter 1401 transmits a third information block; herein, the third information block is used to indicate configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

In one embodiment, the target sub-band in frequency domain comprises a subcarrier belonging to a first BWP, an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

In one embodiment, one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

In one embodiment, the first transmitter 1401 transmits a first signaling; herein, the first signaling is used to determine the target time-frequency resource set, and a type of the first signaling and the target link direction are used to determine whether the execution is transmitting or receiving.

In one embodiment, the second information block comprises M2 sub-information blocks, the M2 sub-information blocks are respectively used to determine slot formats respectively corresponding to M2 candidate sub-bands, the target sub-band is one of the M2 candidate sub-bands, M2 being a positive integer greater than 1.

In one embodiment, when the operation in the present application is receiving, the execution is transmitting; when the operation in the present application is transmitting, the execution is receiving.

In one embodiment, the execution is an action corresponding to the operation in the second node and the first node.

In one embodiment, when the target link direction is uplink, the execution is receiving; when the target link direction is downlink, the execution is transmitting; when the target link method is a flexible link, whether the execution is receiving or transmitting is determined by scheduling or configuration information of the target signal.

In one embodiment, when the target link direction is uplink, the execution is receiving; when the target link direction is downlink, the execution is transmitting.

In one embodiment, when the execution is receiving or the target link direction is uplink, the target signal comprises at least one of a PUSCH, a PUCCH, an SRS, or an uplink DMRS.

In one embodiment, when the execution is transmitting or the target link direction is downlink, the target signal comprises at least one of a PDSCH, a PDCCH, a CSI-RS, a downlink DMRS, a PRS (Positioning Reference Signal).

In one embodiment, when the execution is transmitting, the target sub-band is a downlink BWP; when the execution is receiving, the target sub-band is an uplink BWP; BWP IDs of the downlink BWP and the uplink BWP are the same.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, test device, test equipment, test instrument and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations, test device, test equipment, test instrument and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A first node for wireless communications, comprising:

a first receiver, receiving a first information block and receiving a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; and a first transceiver, determining a target link direction and operating a target signal in a target time-frequency resource set, the target time-frequency resource set comprising at least one time-domain symbol in time domain, a link direction of any time-domain symbol comprised in the target time-frequency resource set in time domain being the target link direction, and the operation being receiving or the operation being transmitting;

wherein a time-domain symbol comprised in the target time-frequency resource set in the time domain is one of the X1 time-domain symbols, and the time-domain symbol comprised in the target time-frequency resource set in the time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

2. The first node according to claim 1, wherein the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

3. The first node according to claim 1, wherein the first receiver receives a third information block; wherein the third information block is used to determine configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

4. The first node according to claim 1, wherein the target sub-band in frequency domain comprises a subcarrier belonging to a first BandWidth Part (BWP), an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

5. The first node according to claim 1, wherein one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

6. The first node according to claim 1, wherein the first receiver receives a first signaling; wherein the first signaling is used to determine the target time-frequency resource set, and a type of the first signaling and the target link direction are used to determine whether the operation is receiving or transmitting.

7. The first node according to claim 1, wherein the second information block comprises M2 sub-information blocks, the M2 sub-information blocks are respectively used to determine slot formats respectively corresponding to M2 candidate sub-bands, and the target sub-band is one of the M2 candidate sub-bands, M2 being a positive integer greater than 1.

8. A second node for wireless communications, comprising:

a first transmitter, transmitting a first information block and transmitting a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; and a second transceiver, determining a target link direction and executing a target signal in a target time-frequency resource set, the target time-frequency resource set comprising at least one time-domain symbol in time domain, a link direction of any time-domain symbol comprised in the target time-frequency resource set in time domain being the target link direction, and the execution being transmitting or the execution is receiving;

wherein a time-domain symbol comprised in the target time-frequency resource set in the time domain is one of the X1 time-domain symbols, and the time-domain symbol comprised in the target time-frequency resource set in the time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to indicate the target link direction, and the target link direction is one of the first link direction or the second link direction.

9. The second node according to claim 8, wherein the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

10. The second node according to claim 8, wherein the first transmitter transmits a third information block; wherein the third information block is used to indicate configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

11. The second node according to claim 8, wherein the target sub-band in frequency domain comprises a subcarrier belonging to a first BandWidth Part (BWP), an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

12. The second node according to claim 8, wherein one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

13. The second node according to claim 8, wherein the first transmitter transmits a first signaling; wherein the first signaling is used to determine the target time-frequency resource set, and a type of the first signaling and the target link direction are used to determine whether the operation is receiving or transmitting.

14. A method in a first node for wireless communications, comprising:

receiving a first information block and receiving a second information block, the first information block being used to determine X1 time-domain symbols corresponding to a first link direction, the second information block being used to determine X2 time-domain symbols corresponding to a second link direction, X1 being a positive integer greater than 1, X2 being a positive integer greater than 1, the first link direction being different from the second link direction; and determining a target link direction and operating a target signal in a target time-frequency resource set, the target time-frequency resource set comprising at least one time-domain symbol in time domain, a link direction of any time-domain symbol comprised in the target time-frequency resource set in time domain being the target link direction, and the operation being receiving or the operation being transmitting;

wherein a time-domain symbol comprised in the target time-frequency resource set in the time domain is one of the X1 time-domain symbols, and the time-domain symbol comprised in the target time-frequency resource set in the time domain is one of the X2 time-domain symbols; the first link direction is one of uplink or downlink, and the second link direction is one of uplink, downlink, or flexible link; any subcarrier comprised in the target time-frequency resource set in frequency domain belongs to a target sub-band, configuration information of the target sub-band is used to determine the target link direction, and the target link direction is one of the first link direction or the second link direction.

15. The method in a first node according to claim 14, wherein the first information block is used to indicate a first number of symbol(s), a second number of symbol(s) and a configuration period length; at least one of the X1 time-domain symbols belongs to a first time window, and a length of the first time window is equal to the configuration period length; a number of time-domain symbol(s) belonging to the first time window among the X1 time-domain symbols is equal to the first number of symbol(s), or a number of time-domain symbol(s) belonging to the first time window among the X1 time-domain symbols is equal to the second number of symbol(s); the first number of symbol(s) is a non-negative integer, the second number of symbol(s) is a non-negative integer, and the configuration period length is greater than 0.

16. The method in a first node according to claim 14, comprising:

receiving a third information block;

wherein the third information block is used to determine configuration information of the target sub-band, the configuration information of the target sub-band comprises at least one of location information of the target sub-band in frequency domain or a link direction indication of the target sub-band; the link direction indication of the target sub-band is used to determine whether the second information block can override a link direction of an uplink time-domain symbol or a downlink time-domain symbol configured by the first information block.

17. The method in a first node according to claim 14, wherein the target sub-band in frequency domain comprises a subcarrier belonging to a first BandWidth Part (BWP), an index of a second BWP is equal to an index of the first BWP, and a link direction corresponding to the first BWP is different from a link direction corresponding to the second BWP; at least one of whether there are overlapping frequency-domain resources between the target sub-band and an initial BWP, whether there are overlapping frequency-domain resources between the target sub-band and a default BWP, or whether center frequency of the first BWP and center frequency of the second BWP are equal is used to determine the target link direction between the first link direction and the second link direction.

18. The method in a first node according to claim 14, wherein one of the X2 time-domain symbols belongs to a slot in a first slot set, and the first slot set comprises at least one slot; the second information block is used to determine a slot format for each slot comprised in the first slot set; a slot format of any slot in the first slot set is one of M1 candidate slot formats, M1 being a positive integer greater than 1; there exists an uplink time-domain symbol comprised in at least one of the M1 candidate slot formats being earlier than a downlink time-domain symbol.

19. The method in a first node according to claim 14, comprising:

receiving a first signaling;

wherein the first signaling is used to determine the target time-frequency resource set, and a type of the first signaling and the target link direction are used to determine whether the operation is receiving or transmitting.

20. The method in a first node according to claim 14, wherein the second information block comprises M2 sub-information blocks, the M2 sub-information blocks are respectively used to determine slot formats respectively corresponding to M2 candidate sub-bands, and the target sub-band is one of the M2 candidate sub-bands, M2 being a positive integer greater than 1.

* * * * *